(12) United States Patent
Momchilov et al.

(10) Patent No.: US 11,394,535 B2
(45) Date of Patent: Jul. 19, 2022

(54) COMPUTING SYSTEM AND RELATED METHODS PROVIDING CONNECTION LEASE INFRASTRUCTURE WITH GATEWAY APPLIANCE FAILOVER

(71) Applicant: CITRIX SYSTEMS, INC., Fort Lauderdale, FL (US)

(72) Inventors: Georgy Momchilov, Parkland, FL (US); Hubert Divoux, Parkland, FL (US); Roberto Valdes, Weston, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 168 days.

(21) Appl. No.: 16/882,856

(22) Filed: May 26, 2020

(65) Prior Publication Data
US 2020/0374274 A1 Nov. 26, 2020

Related U.S. Application Data

(63) Continuation of application No. 16/878,172, filed on May 19, 2020.
(Continued)

(51) Int. Cl.
*H04L 29/06* (2006.01)
*H04L 9/08* (2006.01)
(Continued)

(52) U.S. Cl.
CPC ............ *H04L 9/0827* (2013.01); *G06F 9/455* (2013.01); *H04L 9/0822* (2013.01);
(Continued)

(58) Field of Classification Search
CPC ............................ H04L 9/0827; H04L 9/0822
(Continued)

(56) References Cited

U.S. PATENT DOCUMENTS 8,990,898 B2  3/2015 Bell
9,992,185 B1 * 6/2018 Basha P.R. ......... H04L 63/0281
(Continued)

FOREIGN PATENT DOCUMENTS

EP  2355444  8/2011
WO  WO2009026247  2/2009

OTHER PUBLICATIONS

U.S. Appl. No. 16/416,452, filed May 20, 2019 Momchilov et al.
(Continued)

*Primary Examiner* — Monjur Rahim
(74) *Attorney, Agent, or Firm* — Allen, Dyer, Doppelt + Gilchrist, PA

(57) ABSTRACT

A computing system may include a plurality of Point of Presence computing devices (PoPs) configured to provide access to a computing network(s), and a plurality of gateway appliances. The gateway appliances may be configured to relay communications between client devices and virtual delivery appliances to provide the client devices with access to virtual sessions. The gateway appliances may route client device communications through the PoPs based upon gateway connection tickets, and may also generate the gateway connection tickets including a payload encrypted with a symmetric encryption key, and a plurality of different versions of the symmetric key encrypted with different public encryption keys of the PoPs. The PoPs may be further configured to use their private encryption keys to decrypt the encrypted symmetric key, use the decrypted symmetric key to decrypt the payload, and permit routing of the client communications based upon the decrypted payload of the gateway connection tickets.

22 Claims, 20 Drawing Sheets

Related U.S. Application Data

(60) Provisional application No. 62/850,085, filed on May 20, 2019.

(51) Int. Cl.

| | |
|---|---|
| *H04L 9/40* | (2022.01) |
| *H04L 67/01* | (2022.01) |
| *H04L 9/32* | (2006.01) |
| *G06F 9/455* | (2018.01) |
| *H04L 12/66* | (2006.01) |
| *H04L 12/46* | (2006.01) |
| *H04L 67/02* | (2022.01) |
| *H04L 67/125* | (2022.01) |
| *H04L 67/141* | (2022.01) |
| *H04L 67/63* | (2022.01) |
| *H04L 9/14* | (2006.01) |
| *H04L 9/30* | (2006.01) |

(52) U.S. Cl.
CPC ............ *H04L 9/0825* (2013.01); *H04L 9/14* (2013.01); *H04L 9/3073* (2013.01); *H04L 9/3231* (2013.01); *H04L 12/4633* (2013.01); *H04L 12/66* (2013.01); *H04L 63/029* (2013.01); *H04L 63/0245* (2013.01); *H04L 63/0435* (2013.01); *H04L 63/06* (2013.01); *H04L 63/061* (2013.01); *H04L 63/0861* (2013.01); *H04L 63/10* (2013.01); *H04L 67/02* (2013.01); *H04L 67/125* (2013.01); *H04L 67/141* (2013.01); *H04L 67/327* (2013.01); *H04L 67/42* (2013.01)

(58) Field of Classification Search
USPC .......................................... 713/153
See application file for complete search history.

(56) References Cited

U.S. PATENT DOCUMENTS

| | | | |
|---|---|---|---|
| 10,200,282 | B1* | 2/2019 | Sidebottom ......... H04L 61/2514 |
| 2004/0078593 | A1 | 4/2004 | Hind et al. |
| 2008/0235511 | A1 | 9/2008 | O'Brien et al. |
| 2016/0234209 | A1 | 8/2016 | Kahol et al. |
| 2020/0162560 | A1 | 5/2020 | Singleton, IV et al. |
| 2020/0218559 | A1 | 7/2020 | Singleton, IV et al. |
| 2021/0168198 | A1* | 6/2021 | Liljenstolpe ............ H04L 9/006 |

OTHER PUBLICATIONS

U.S. Appl. No. 16/416,481, filed May 20, 2019 Momchilov et al.
U.S. Appl. No. 16/421,846, filed May 24, 2019 Momchilov et al.
U.S. Appl. No. 16/739,342, filed Jan. 10, 2020 Momchilov et al.
U.S. Appl. No. 16/847,780, filed Apr. 14, 2020 Momchilov et al.
U.S. Appl. No. 16/876,632, filed May 18, 2020 Momchilov et al.

* cited by examiner

COMPUTING SYSTEM AND RELATED METHODS PROVIDING CONNECTION LEASE INFRASTRUCTURE WITH GATEWAY APPLIANCE FAILOVER

CROSS-REFERENCE TO RELATED APPLICATIONS

This application is a continuation of U.S. patent application Ser. No. 16/878,172 filed May 20, 2020 which claims the benefit of U.S. provisional application No. 62/850,085 filed May 20, 2019, which are hereby incorporated herein in their entireties by reference.

BACKGROUND

Many organizations are now using application and/or desktop virtualization to provide a more flexible option to address the varying needs of their users. In desktop virtualization, a user's operating system, applications, and/or user settings may be separated from the user's physical smartphone, laptop, or desktop computer. Using client-server technology, a "virtualized desktop" may be stored in and administered by a remote server, rather than in the local storage of a client computing device.

There are several different types of desktop virtualization systems. As an example, Virtual Desktop Infrastructure (VDI) refers to the process of running a user desktop and/or application inside a virtual machine that resides on a server. Virtualization systems may also be implemented in a cloud computing environment in which a pool of computing desktop virtualization servers, storage disks, networking hardware, and other physical resources may be used to provision virtual desktops, and/or provide access to shared applications.

SUMMARY

A method may include, at a gateway appliance, relaying communications between client devices requesting access to virtual sessions and virtual delivery appliances providing the client devices with access to the virtual sessions, and routing client device communications through a plurality of Point of Presence (PoP) computing devices configured to provide access to at least one computing network based upon gateway connection tickets. The PoP computing devices may have respective public/private encryption key pairs associated therewith. The method may further include, at the gateway appliance, generating the gateway connection tickets including a payload encrypted with a symmetric encryption key, and a plurality of different versions of the symmetric key encrypted with different public encryption keys of the PoP computing devices so that the PoP computing devices may use their private encryption keys to decrypt the version of the symmetric key encrypted with their public encryption keys, use the decrypted symmetric key to decrypt the payload, and permit routing of the client communications based upon the decrypted payload of the gateway connection tickets.

In an example embodiment, the gateway connection tickets may be further signed by private encryption keys of the PoP computing devices. The method may also include, at the gateway appliance, exchanging authorization and virtual session delivery data of the client communications using separate tunnels over a common transport layer session. The gateway connection tickets may further comprise an expiration time after which the gateway appliance will no longer permit routing of the client communications, for example. Also by way of example, the gateway connection tickets may further comprise a creation time, and the method may further include, at the gateway appliance, ceasing permitting routing of the client communications for creation times older than a threshold age.

In an example implementation, the gateway connection tickets may further include an authentication token so that the client devices do not have to resend login credentials after establishing a connection with a gateway appliance. Furthermore, the payloads of the gateway connection tickets may comprise at least one of a virtual delivery appliance Internet Protocol (IP) address, fully qualified domain name (FQDN), and a network port number. In another example, the method may further include, at the gateway appliance, authorizing connections from the client devices to the virtual delivery appliances by verifying the signatures of the gateway connection tickets and an expiration time of the gateway connection tickets. In addition, the method may also include, at the gateway appliance, recovering the payload using the symmetric key responsive to the verification of the signatures.

A related computing system may include a plurality of PoP computing devices configured to provide access to at least one computing network, the PoP computing devices having respective public/private encryption key pairs associated therewith, and a plurality of gateway appliances. The gateway appliances may be configured to relay communications between client devices requesting access to virtual sessions and virtual delivery appliances to provide the client devices with access to the virtual sessions, with the gateway appliances routing client device communications through the PoP computing devices based upon gateway connection tickets. The gateway appliances may also generate the gateway connection tickets including a payload encrypted with a symmetric encryption key, and a plurality of different versions of the symmetric key encrypted with different public encryption keys of the PoP computing devices. The PoP computing devices may be further configured to use their private encryption keys to decrypt the version of the symmetric key encrypted with their public encryption keys, use the decrypted symmetric key to decrypt the payload, and permit routing of the client communications based upon the decrypted payload of the gateway connection tickets.

A related gateway appliance may include a memory and a processor configured to cooperate with the memory to relay communications between client devices requesting access to virtual sessions and virtual delivery appliances providing the client devices with access to the virtual sessions, and route client device communications through a plurality of PoP computing devices configured to provide access to at least one computing network based upon gateway connection tickets, with the PoP computing devices having respective public/private encryption key pairs associated therewith. The processor may further generate the gateway connection tickets including a payload encrypted with a symmetric encryption key, and a plurality of different versions of the symmetric key encrypted with different public encryption keys of the PoP computing devices so that the PoP computing devices may use their private encryption keys to decrypt the version of the symmetric key encrypted with their public encryption keys, use the decrypted symmetric key to decrypt the payload, and permit routing of the client communications based upon the decrypted payload of the gateway connection tickets.

DETAILED DESCRIPTION

Virtual computing infrastructures utilize gateway devices to provide secure tunneling and access to backend company resources. However, even with network-level encryption, gateway devices as entities in the middle terminate the secure tunnels in order to relay communications between client devices and virtual delivery appliances. Thus, there is a potential for gateway devices to observe the traffic between client devices and virtual delivery appliances, posing potential privacy and security concerns. The approaches set forth herein overcome these technical problems within a virtual computing infrastructure using connection leases to authorize client devices to access virtual sessions. This is done through an embedded connection lease exchange tunnel configuration and symmetric key exchange approach which allows client devices and virtual delivery appliances to communicate without risking unwanted exposure of data at the gateway appliance. Moreover, this also overcomes technical problems with resiliency and logon times with respect to the client device-gateway appliance-virtual delivery appliance connections, in that separate authentication and payload tunnels may be established for resiliency, yet within a common transport layer session which is re-used to provide decreased login time. Furthermore, a secure symmetric encryption key exchange is provided between client devices and virtual delivery appliances so that a gateway appliance relaying encrypted communications between them is unable to decrypt and access the information in the communications. Furthermore, a secure gateway connection ticket exchange is provided between client devices and gateway appliances to enable secure, resilient and efficient gateway appliance failover in case of failure or unavailability of one or more gateway appliances, and without disrupting payload tunnels between client devices and virtual delivery appliances.

Figure 1:
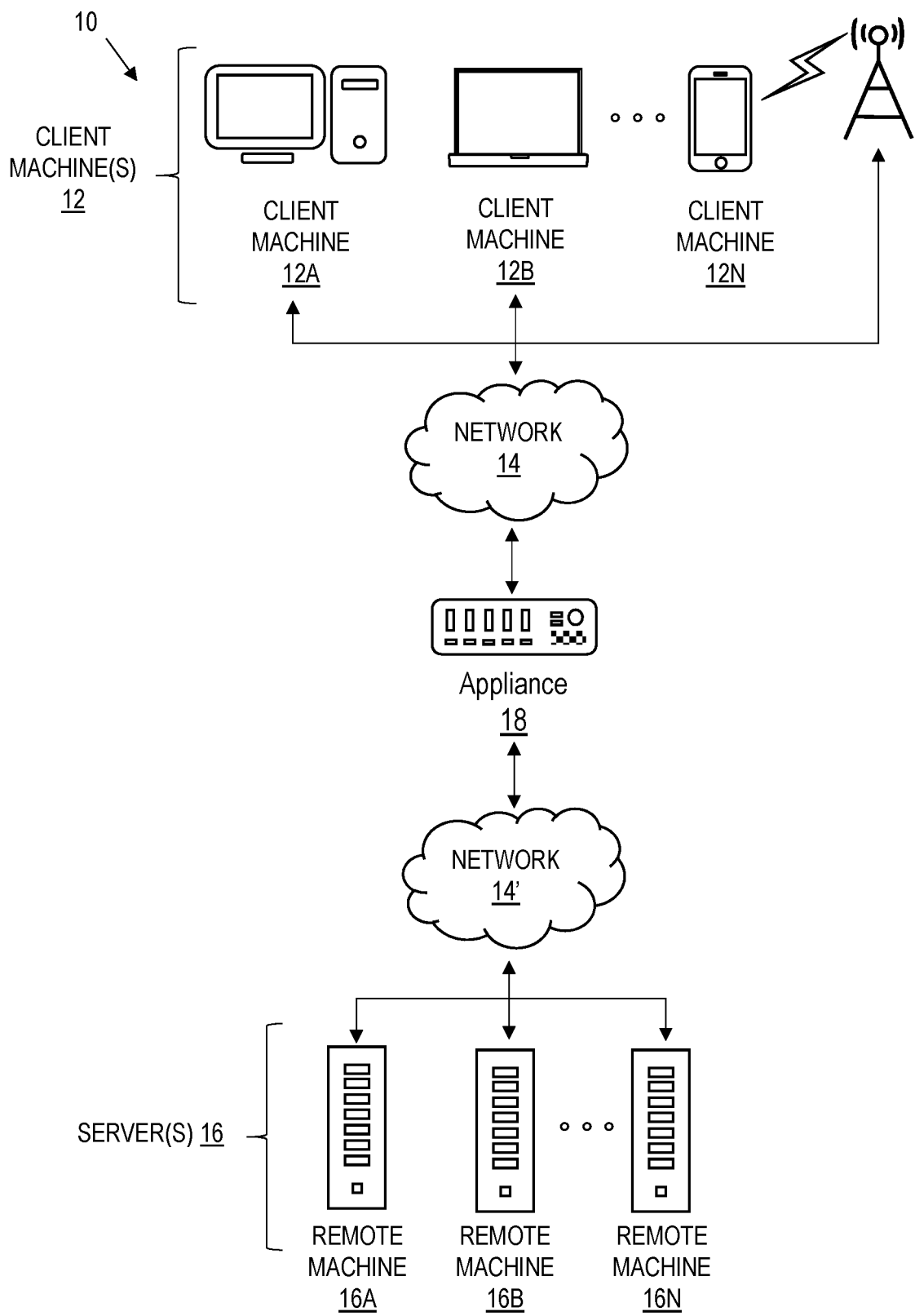
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
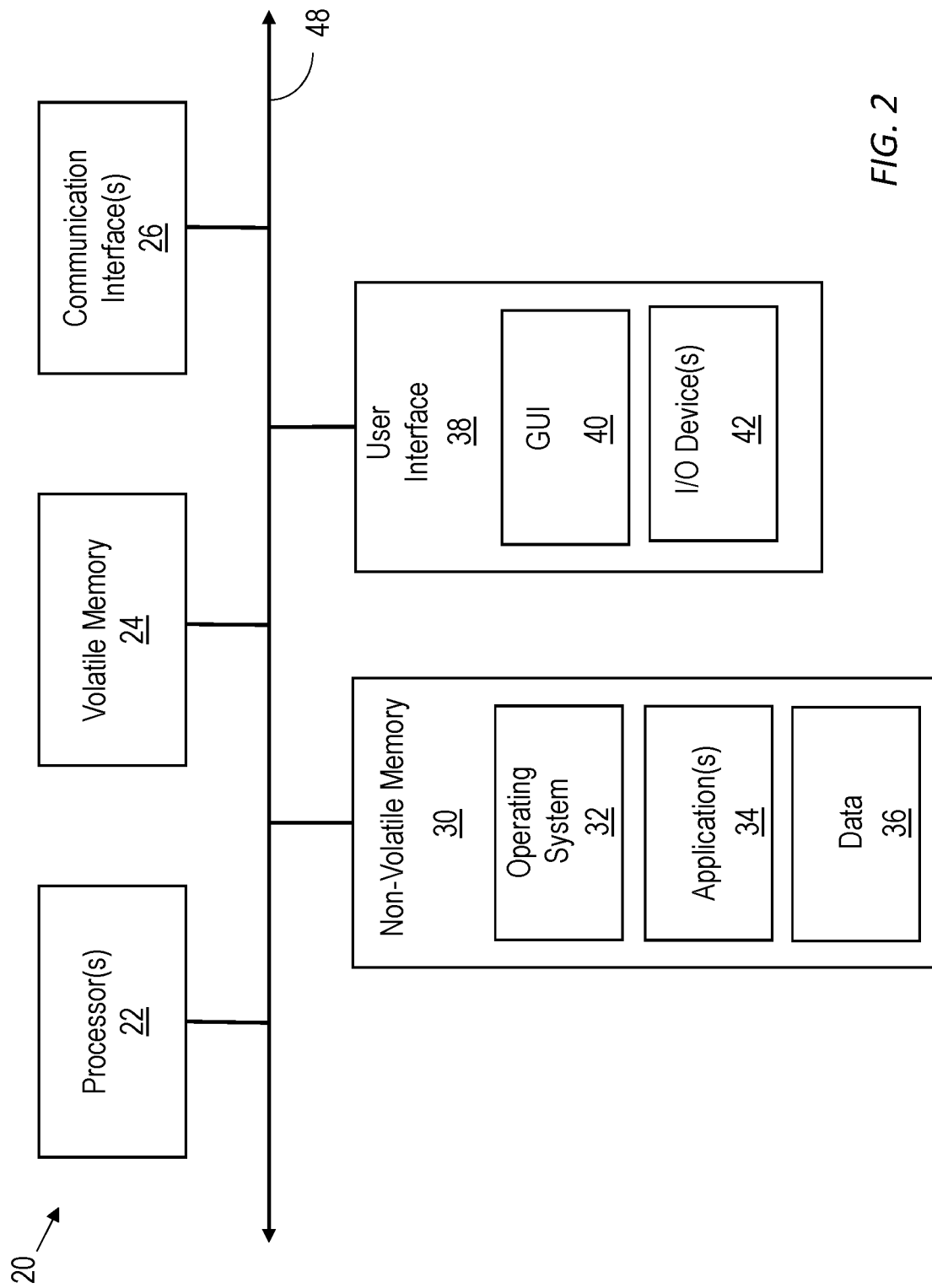
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
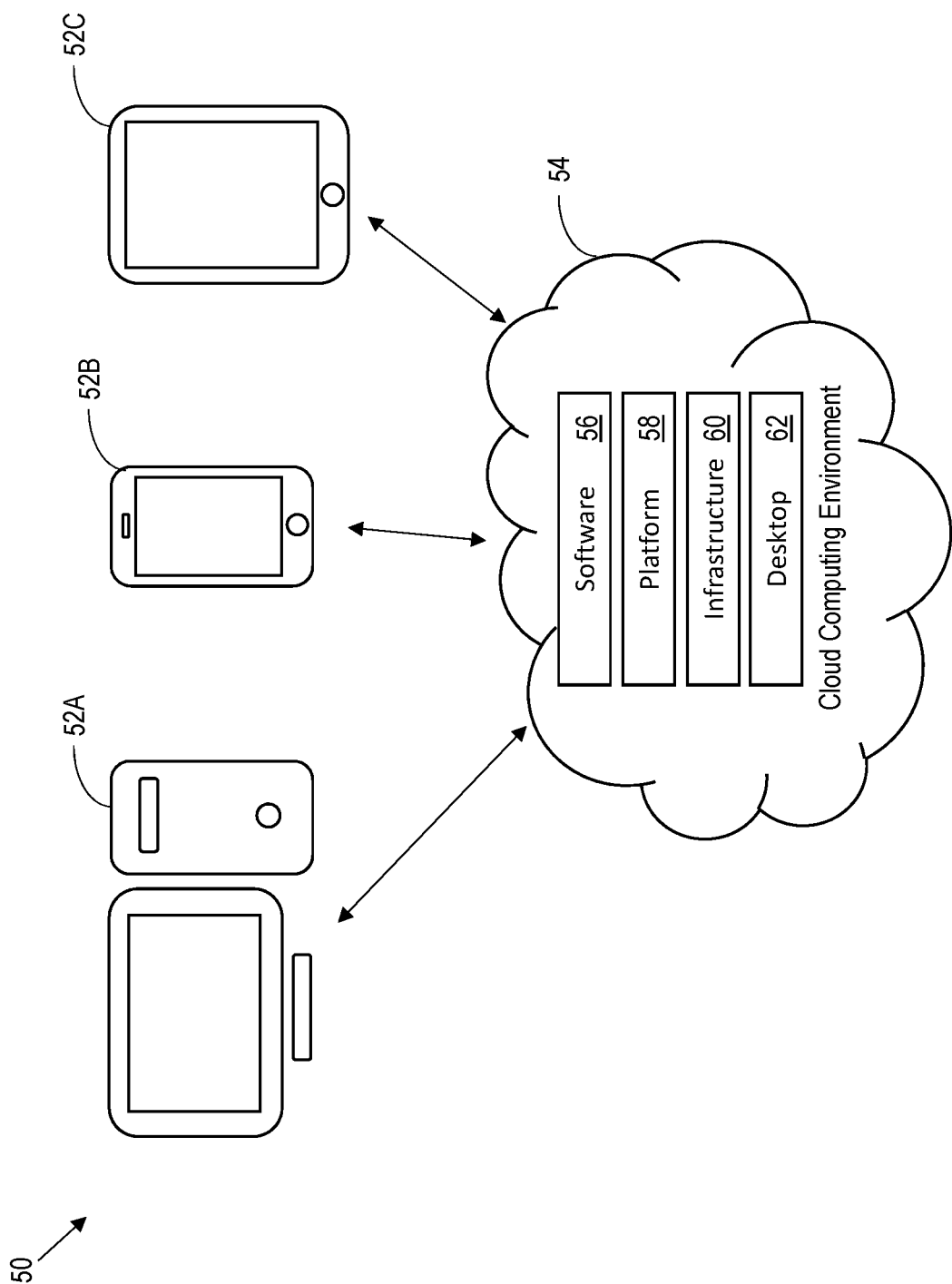
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
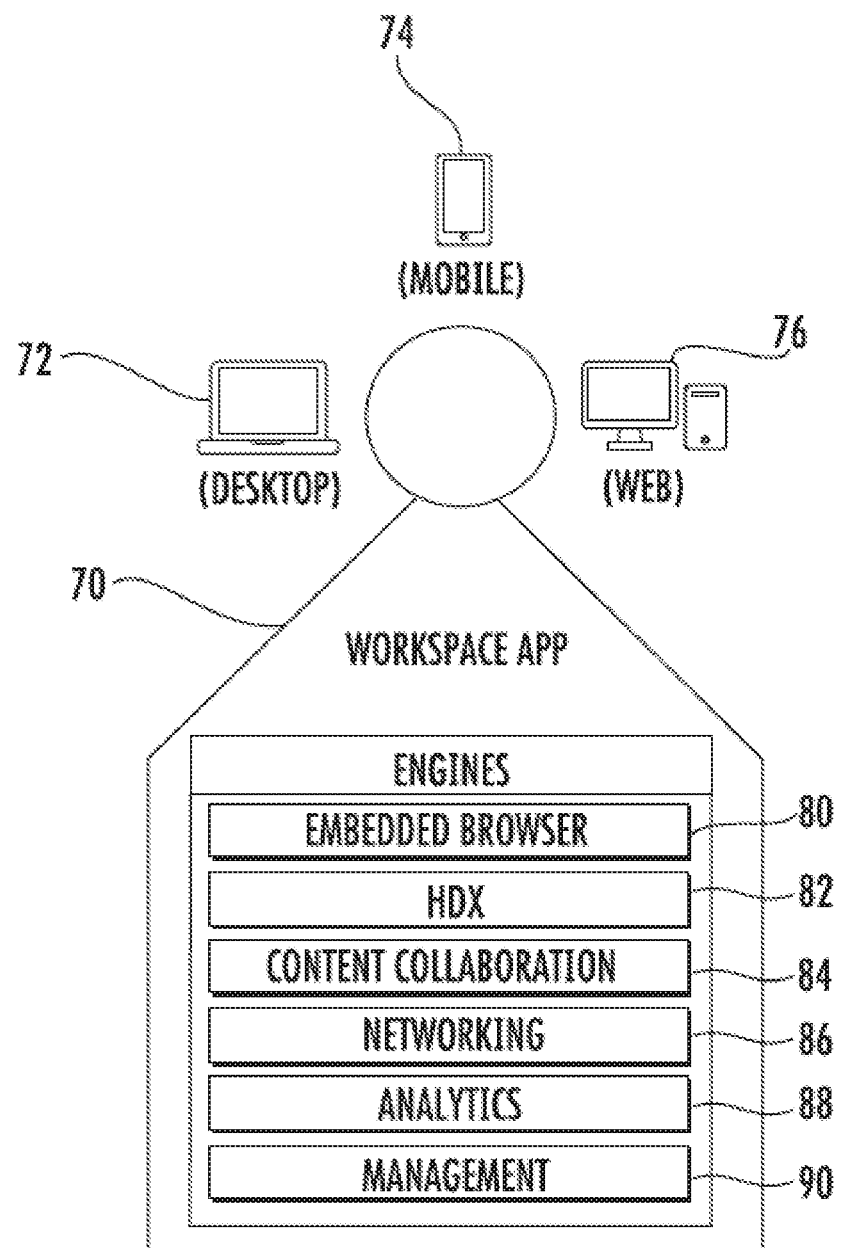
FIG. 4 is a schematic block diagram of desktop, mobile and web-based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific μ-VPN connection. A μ-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
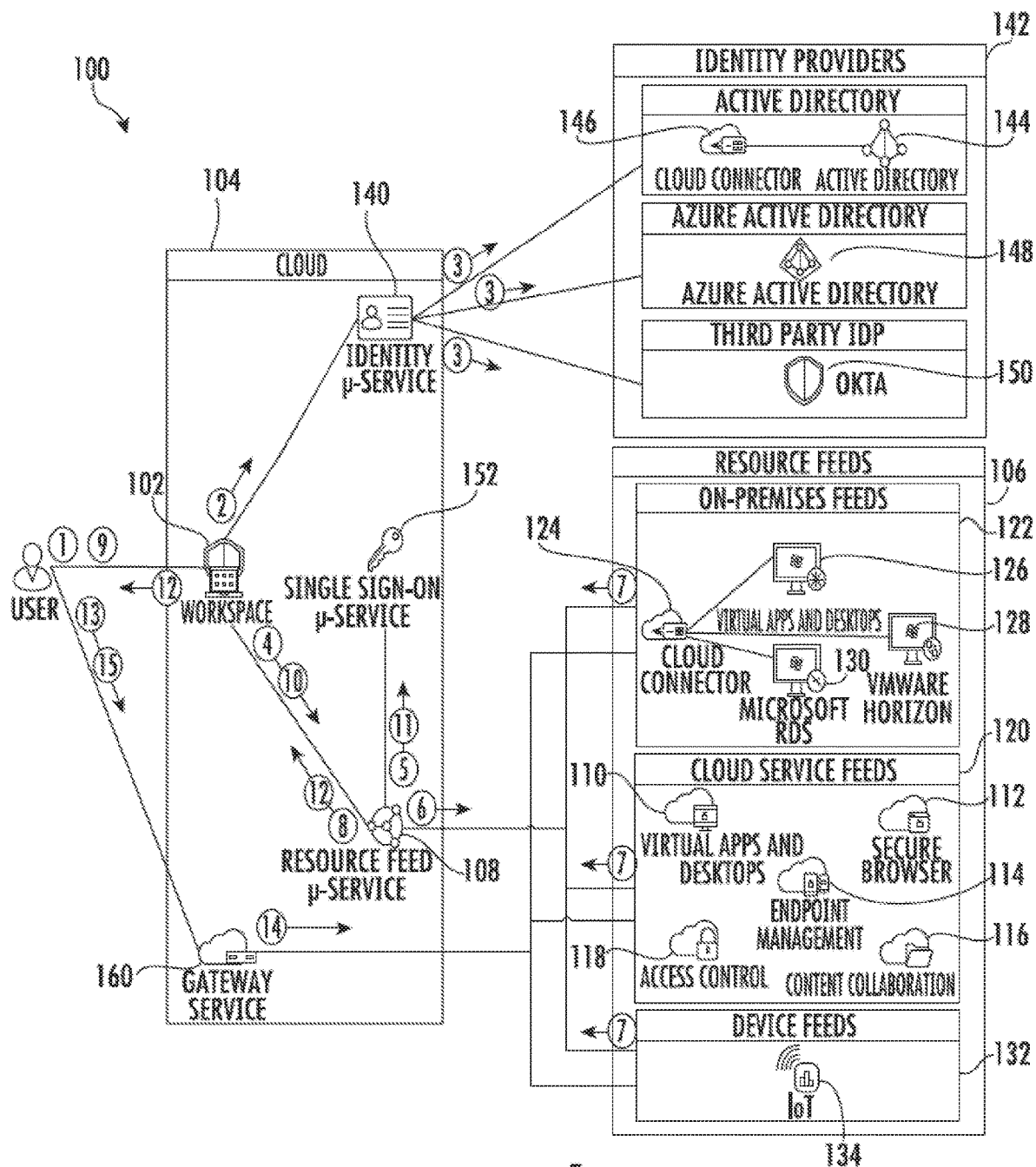
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Cloud 104. The workspace experience service 102 then pulls in all the different resource feeds 16 via a resource feed micro-service 108. That is, all the different resources from other services running in the Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Cloud 104, and presenting their identity (event 1). The identity includes a username and password, for example.

The workspace experience service 102 forwards the user's identity to an identity micro-service 140 within the Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third-party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
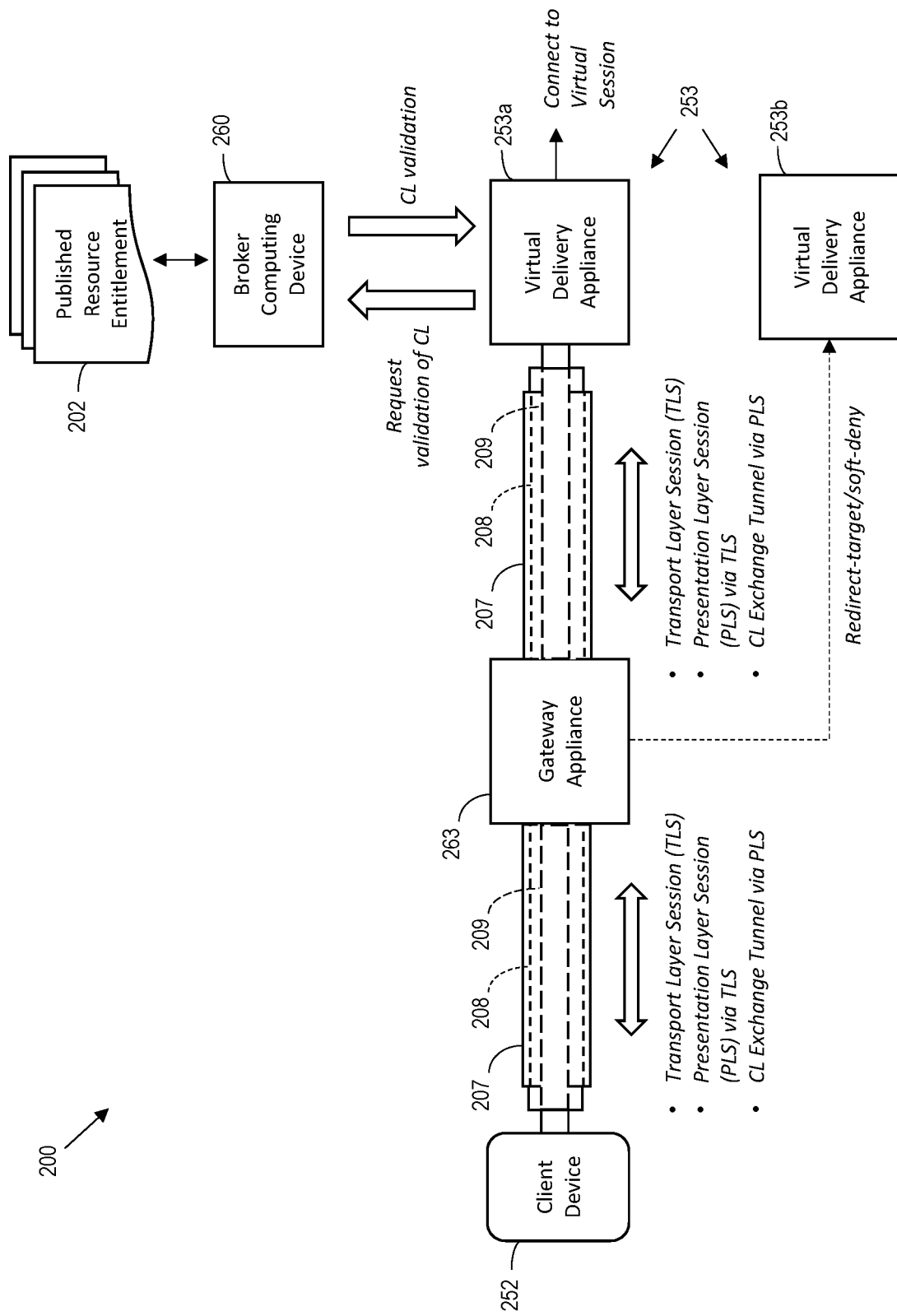
FIG. 6 is a schematic block diagram of a computing system providing a connection lease exchange mutual trust protocol connection between components in a connection lease configuration in an example embodiment.

Turning now to FIG. 6, a virtual computing system 200 is first described which provides for enhanced resiliency and trust between components within a virtual computing architecture utilizing connection leases. Computer virtualization infrastructures may utilize enhancements to the Independent Computing Architecture (ICA) protocol or ICA and additional protocols to implement connection leases (CLs) for authenticating client devices to access respective virtual sessions and computing resources. ICA is a protocol designed for transmitting Windows graphical display data as well as keyboard and mouse input over a network. Traditionally, connection descriptor files, e.g., ICA files, contain short-lived Secure Ticket Authority (STA) and logon tickets. The STA ticket may be used to authorize a connection to a virtual delivery appliance (e.g., Citrix Virtual Delivery Agent (VDA)) via a gateway (e.g., Citrix Gateway or Citrix Gateway Service). The logon ticket may single-sign-on (SSOn) the user into the virtual computing session. In the case of CVAD, this is done through a "high-definition" experience (HDX) session, which may be available to users of centralized applications and desktops, on different client devices and over different networks. Citrix HDX is built on top of the ICA remoting protocol.

Since connection leases are long-lived, e.g., a few hours to weeks based on policies, and therefore the attack opportunity window is much longer, the security requirements are increased. Therefore, CLs are encrypted and signed. CLs may also be revoked to cope with events such as a stolen device, compromised user account, closed user account, etc. CL revocation is applied when a client/endpoint device or host (VDA) is online with respect to a CL Issuing Service (CLIS) or Broker, but this is not a requirement for use of a CL, since CLs are meant to be used in offline mode.

The system 200 illustratively includes a gateway appliance 263, virtual delivery appliances 253, and client devices 252 which request virtual sessions from the virtual delivery appliances through the gateway appliance. As will be discussed further below, this may be done through connection leases issued to the client devices 252, which the client devices provide to the virtual delivery appliances 253. The virtual delivery appliances 253 may perform a "reverse prepare for session" operation, in which they provide received connection leases to a broker computing device 260. The broker computing device 260 maintains updates to the published resource entitlements 202 that client device 252 is authorized to access, and validates the connection lease requests to the virtual delivery appliances 253 as the published resource entitlements allow. In the illustrated example, upon validation of a connection lease, the virtual delivery appliance 253*a* may then connect the requesting client device 252 with a virtual session (e.g., virtual app or desktop, SaaS, DaaS, etc.).

Connection leases represent a snapshot of entitlements, resource locations, etc. Use of connection leases may present a challenge in establishing trust between different entities such as client devices (or endpoints) 252, gateways 263 (e.g., Citrix Gateway), virtual delivery appliances 253 (e.g., Citrix VDA), or other service instances, some of which have relatively limited lifetimes, e.g., pooled desktops or other cloud-hosted resources. Traditional certificate methods require a relatively complex distributed infrastructure. For example, X.509 digital certificates are a complex Abstract Syntax Notation One (ASN.1) format and are typically associated with a whole Public Key Infrastructure (PKI), which is notoriously complex to deploy and maintain, e.g. includes setting up Certificate Authorities (CAs) and complex distributed certificate management. Implementing even a minimal subset of what is required to handle X.509 certificates is an expensive task. In contrast, connection leasing may be implemented without a complex PKI by using "bare" cryptographic key pairs for each entity such as client devices 252, virtual delivery appliances 253, gateway appliances 263, broker 260, etc. Each entity's public key could be signed by a common Root of Trust (RoT) following robust authentication. Signature validation of the public keys could be utilized as part of distributed trust establishment between the entities. In some implementations, JavaScript Object Notation (JSON) Web Signature (JWS) could be used to carry a signed public key along with any required extra information, e.g. signature algorithm identified by a JSON Web Algorithms (JWA) identifier, signing entity unique identifier, timestamp, etc. For resiliency, rotating the RoT cryptographic key pair would require maintaining at least two such pairs, implying that each entity would have to have its public key signed at least twice. Furthermore, in some implementations, connection leases may be implemented as encrypted and signed JSON documents containing information on published resource entitlements, resource locations, etc.

Turning back to FIG. 6, gateway appliances 263 provide secure tunneling and access to backend company resources, such as through Transport Layer Security (TLS) or Datagram TLS (DTLS). However, even with network-level encryption, gateway appliances 263 as entities in the middle terminate TLS/DTLS. Thus, gateway appliances 263 may otherwise be able to observe the traffic between a client device 252 and a virtual delivery appliance 253*a*. This poses privacy and security concerns. For example, this might allow a gateway appliance 263 to access user credentials, files, Universal Serial Bus (USB) traffic, graphics, video, audio, as well as other confidential data "in flight".

Conversely, virtual delivery appliances 253 and gateway appliances 263 may exchange monitoring, telemetry or other data that is not meant for other network entities, but the data may nevertheless be visible. For example, due to termination in network-level encryption, a client device 252 or a network appliance in the middle between the client device 252 and virtual delivery appliance 253a would be able to see virtual channel traffic such as analytics data, telemetry data, audio/video, etc.

As will be discussed further below, gateway appliances 263 have multiple Points of Presence (POPs) for accessing a computing network (e.g., cloud computing infrastructures such as AWS, Azure, etc.) for performance, load-balancing and resiliency. Mechanisms such as the Secure Ticket Authority (STA) Service and STA tickets allow for hiding virtual delivery appliance 253 or other internal service details, pre-authorization of connections, and the use of refresh STA tickets in fail-over scenarios. However, the STA Service itself may have resiliency and scalability issues. For example, if the STA Service goes down, in the example of a connection, (re)establishment via a gateway using that service may fail.

Connection leases and the associated authorization mechanisms are meant to be general-purpose and not tied to a specific use case. Therefore, the system 200 provides for a reusable connection lease exchange, mutual trust establishment and authorization protocol (CLXMTP) that can be applied to various computing infrastructure use cases. As a practical concern it is also desirable to avoid updates to existing protocols which may be relatively complex, while also minimizing any impact to logon time. One of the contributing factors to logon time is the transport establishment between a remote client device 252 and a gateway appliance 263 or a virtual delivery appliance 253. This is especially important for cloud use cases, e.g. using gateway as a cloud service, where connection latencies may be higher. Traditional pre-authorization methods (e.g., STA tickets) require the establishment of a new transport, which delays logon to the virtual delivery appliance 253a. Still another concern is potentially insecure transitions between web and native client device 252 connection applications, such as Web CWA and native CWA. For example, users may prefer a modern browser workspace store experience with Web CWA but, while launching a published resource, may also utilize, or flip to, the native CWA for better HDX performance and device platform-integrated feature set. Another example is the transition, or roaming, from a CWA running on a client device 252 (e.g. a mobile device) to a CWA running on a different device (e.g. Workspace Hub device). In these type of app or device transitions, connection information and other sensitive data may be exposed if the communication is not properly secured.

The system 200 may provide a relatively robust mechanism for establishing distributed trust between the above-described components, yet with reduced complexity compared to previous approaches. Moreover, it may also provide an improved approach for resilient gateway failover, as will be further discussed below.

More particularly, in the illustrated example the virtual delivery appliances 253 are configured to cooperate with the gateway appliance 263 to establish a transport layer session 207 between the gateway appliance and virtual delivery appliance, establish a presentation layer session 208 via the transport layer session, and establish a connection lease exchange tunnel 209 via the presentation layer session. The virtual delivery appliance 253a may accordingly receive a connection lease from the client device 252 via the gateway appliance 263 through the connection lease exchange tunnel 209, and then perform the above-described lease validation process with the broker computing device 260. The virtual delivery appliance 253a may further issue a resource connection ticket to the client device 252 through the connection lease exchange tunnel 209 responsive to the validation.

By way of example, the presentation layer session 208 may be a Common Gateway Protocol (CGP) session, and the transport layer session 207 may be a Transport Layer Security (TLS) session or a Transmission Control Protocol (TCP) session. Also by way of example, the transport layer session 207 may comprise at least one of an Enlightened Data Transport (EDT) session, Datagram Transport Layer Security (DTLS) session, and a User Datagram Protocol (UDP) session.

Figure 7:
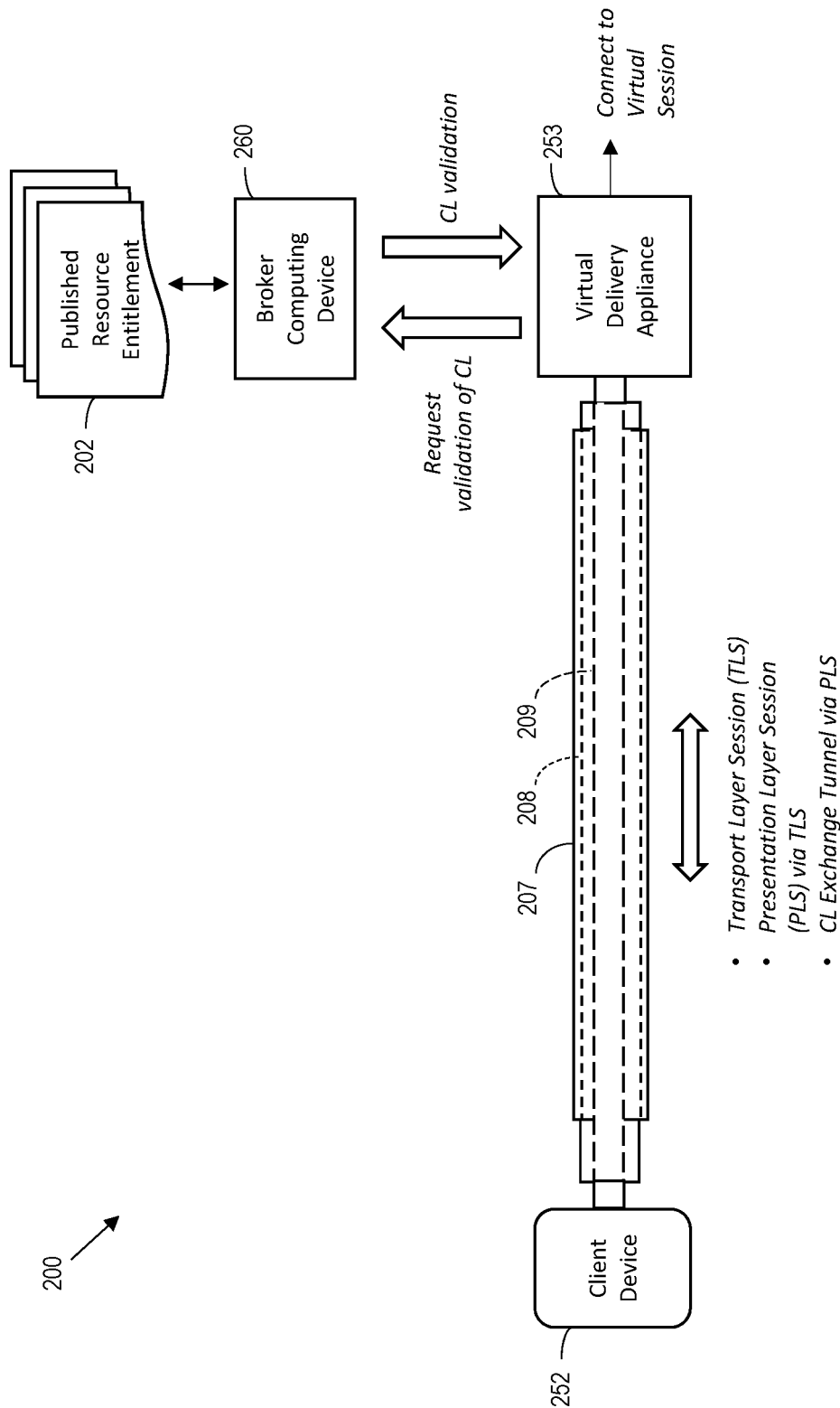
FIG. 7 is a schematic block diagram of an alternate configuration of the system of FIG. 6.

In the illustrated example, a similar connection lease exchange tunnel 209 is also established between the gateway appliance 263 and the client device 252. More particularly, a client transport layer session 207 is established between the gateway appliance 263 and the client device 252, along with a client presentation layer session 208 via the transport layer session, and a client connection lease exchange tunnel 209 via the presentation layer session, by which the client device 252 may communicate the connection lease through the gateway appliance 263 to the virtual delivery appliance 253. It should be noted that the gateway appliance 263 may be at least one of an on-premises gateway appliance and a gateway as a service in the cloud, or it could be a combination of on-premises appliance and a gateway as a service. It should be noted that a gateway appliance 263 need not be used in all embodiments, and a connection lease exchange tunnel 209 may be established directly in the same manner described above between a client device 252 and a virtual delivery appliance 253, as shown in FIG. 7. Further details regarding establishing connection lease exchange tunnels 209 will be discussed below with reference to FIGS. 9-12, but first an example lease architecture in which the system 200 may be implemented is now described.

More particularly, an example implementation of a computing system 250 providing a connection lease infrastructure for accessing virtual sessions is now described with reference to FIG. 8. In the illustrated example, the above-described brokering and lease generation functions are performed within a cloud computing service 255 (e.g., Citrix Cloud) which illustratively includes a cloud interface 256 configured to interface with a client device 252 for enrollment and lease generation to access virtual sessions 254. In an example embodiment, the cloud interface 256 may be implemented with Citrix Workspace, and the client device 252 may be running Citrix Workspace App (CWA), although other suitable platforms may be used in different embodiments. The cloud computing service 255 further illustratively includes a Root of Trust (RoT) 257, Connection Lease Issuing Service (CLIS) 258, gateway service 259, broker 260, and database 261, which will be described further below.

The client device 252 has a public-private encryption key pair associated therewith, which in the illustrated example is created by a hardware-backed key store 262. The hardware-backed key store 262 prevents the client device 252 operating system (OS) from accessing the private key. The client device 252 OS performs cryptographic operations with the private key, but without the ability to access/export the key. Examples of hardware-backed key stores include Trusted Platform Module (TPM) on a personal computer (PC), iOS Secure Enclave, and Android Hardware Key Store, for example, although other suitable encryption key generation platforms may also be used. By way of background, in some embodiments, a hardware-backed key store 262, such as a TPM, is a microchip installed on the motherboard of client device 252 and designed to provide basic security-related functions, e.g., primarily involving encryption keys. A hardware-backed key store 262 communicates with the remainder of the system by using a hardware bus.

A client device 252 that incorporates a hardware-backed key store 262 can create cryptographic keys and encrypt them so that they can only be decrypted by the hardware-backed key store 262. This process, referred to as wrapping or binding a key, can help protect the key from disclosure to any other component, software, process, or user. A hardware-backed key store 262 could have a master wrapping key, called the storage root key, which is stored within the hardware-backed key store 262 itself. The private portion of a storage root key or endorsement key that is created in a hardware-backed key store 262 is never exposed to any other component, software, process, or user. Because a hardware-backed key store 262 uses its own internal firmware and logic circuits to process instructions, it does not rely on the operating system, and it is not exposed to vulnerabilities that might exist in the operating system or application software.

Turning back to FIG. 8, the client device 252 provides its public key to the cloud interface 256 (step (1) in FIG. 8), which then has the public key signed by the RoT 257 (step (2) in FIG. 8) and returns the signed public key to the client device (step (3) in FIG. 8). Having the public key signed by the RoT 257 is significant because the gateway 263, the virtual delivery appliance 253, and the broker 260 also trust the RoT and can therefore use its signature to authenticate the client device public key.

Figure 8:
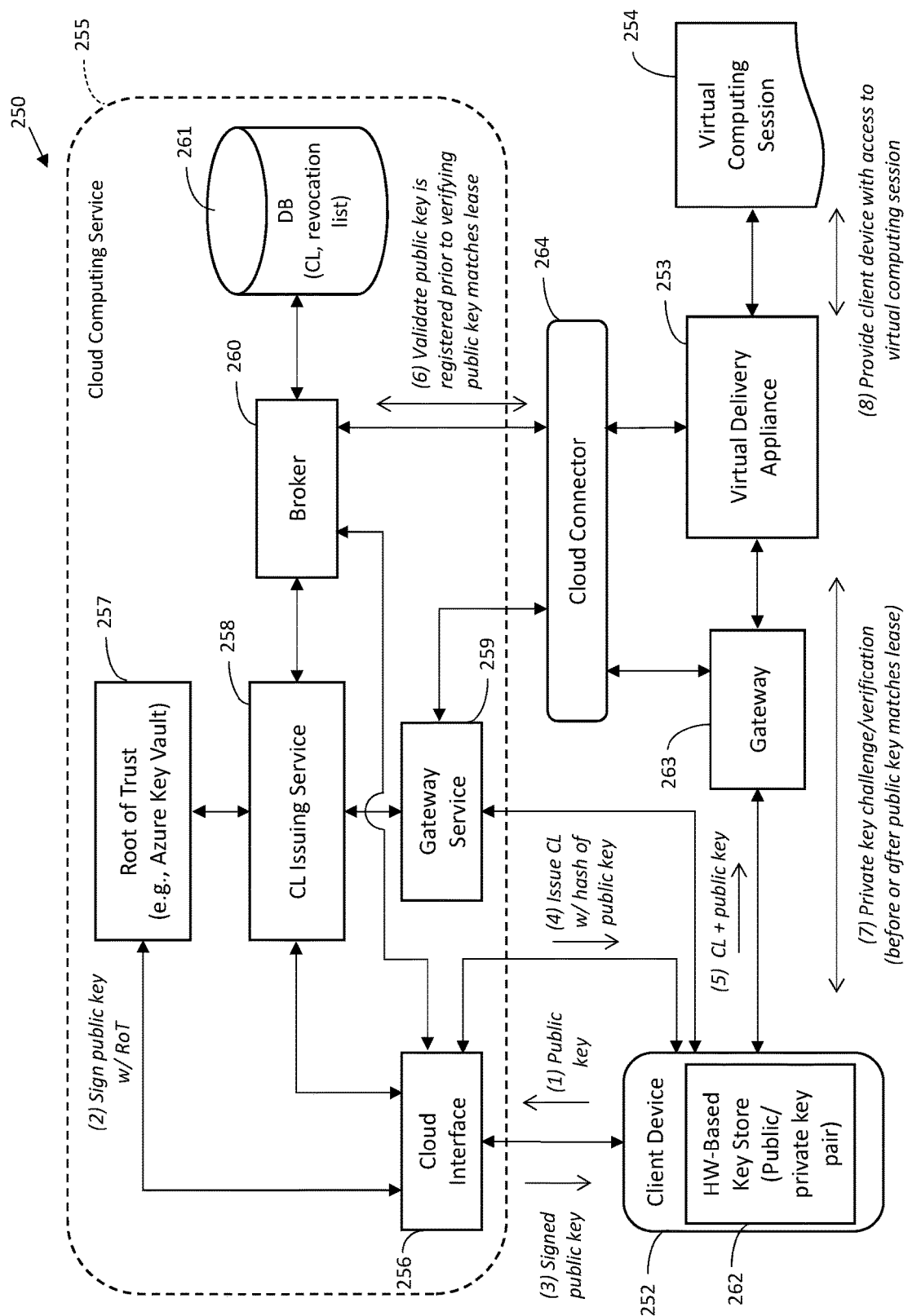
FIG. 8 is a schematic block diagram of a connection lease architecture and independent flow sequences in which example embodiments of the systems set forth herein may be implemented.

The client device 252 may then communicate with the CLIS 258 via the cloud interface 256 to obtain the connection lease (step (4) in FIG. 8). The client device 252 public key may be provided to a host or virtual delivery appliance 253 (e.g., Citrix VDA) either indirectly via the broker 260 or directly by the client device. If the client device 252 public key is indirectly provided to the virtual delivery appliance 253, then the security associated with the client-to-broker communications and virtual delivery appliance-to-broker communications may be leveraged for secure client public key transmission. However, this may involve a relatively large number of client public keys (from multiple different client devices 252) being communicated indirectly to the virtual delivery appliance 253.

On the other hand, the client device 252 public key could be directly provided by the client device to the virtual delivery appliance 253, which in the present case is done via the gateway 263 (step (5) in FIG. 8), but it should be understood that it could also be done via the gateway service 259. Both the client device 252 and the virtual delivery appliance 253 trust the RoT 257. Since the virtual delivery appliance 253 trusts the RoT 257 and has access to the RoT public key, the virtual delivery appliance 253 is able to verify the validity of the client device 252 based on the RoT signature on the public key and, if valid, may then trust the client device public key. In yet another embodiment, the client device public key may also optionally be signed by the broker 260 beforehand. Both the client device 252 and the virtual delivery appliance 253 trust the broker 260. Since the virtual delivery appliance 253 trusts the broker 260 and has access to the broker public key, the virtual delivery appliance 253 is able to verify the validity of the client device 252 based on the broker signature on the public key and, if valid, may then trust the client device public key. In the illustrated example, the signed public key of the client device 252 is provided directly to the virtual delivery appliance 253 along with the connection lease via a gateway 263. In an example implementation, the gateway 263 may be implemented using Citrix Gateway, for example, and the gateway service 259 may be implemented using Citrix Gateway Service, although other suitable platforms may also be used in different embodiments.

The virtual delivery appliance 253 and gateway 263 may communicate with the broker 260 and gateway service 259 (which may be implemented using Citrix Secure Web Gateway, or Citrix Gateway Service, for example) via a cloud connector 264. In an example embodiment, the cloud connector 264 may be implemented with Citrix Cloud Connector, although other suitable platforms may also be used in different embodiments. Citrix Cloud Connector is a component that serves as a channel for communication between Citrix Cloud and customer resource locations, enabling cloud management without requiring complex networking or infrastructure configuration. However, other suitable cloud connection infrastructure may also be used in different embodiments.

The client device 252 signed public key or a hash of the client device signed public key (thumbprint) is included in the connection lease generated by the CLIS 258 and is one of the fields of the connection lease that are included when computing the signature of the connection lease. The signature of the connection lease helps ensure that the connection lease contents are valid and have not been tampered with. As a result, a connection lease is created for the specific client device 252, not just a specific authenticated user.

Furthermore, the virtual delivery appliance 253 may use a challenge-response to validate that the client device 252 is the true owner of the corresponding private key. First, the virtual delivery appliance 253 validates that the client device 252 public key is valid, and more particularly signed by the RoT 257 and/or broker 260 (step (6) in FIG. 8). In the illustrated example, the client device 252 public key was sent directly by the client device to the virtual delivery appliance 253, as noted above. In some embodiments, connection lease revocation may be applied when a client device 252 or virtual delivery appliance 253 is offline with respect to the CLIS 258 or broker 260. Being online is not a requirement for use of a connection lease since connection leases may be used in an offline mode. Connection lease and revocation list details may be stored in the database 261 for comparison by the broker 260 with the information provided by the virtual delivery appliance 253.

Second, upon early session establishment, e.g. after transport and presentation-level protocol establishment, between the client device 252 and virtual delivery appliance 253, the virtual delivery appliance 253 challenges the client device 252 to sign a nonce (an arbitrary number used once in a cryptographic communication) with its private key (step (7) in FIG. 8). The virtual delivery appliance 253 verifies the signature of the nonce with the client device 252 public key. This allows the virtual delivery appliance 253 to know that the client device 252 is in fact the owner of the corresponding private key. It should be noted that this step could be performed prior to validating the public key of the client device 252 with the RoT 257 and/or broker 260 in some embodiments, if desired.

Furthermore, the virtual delivery appliance 253 validates that the connection lease includes the public key (or hash of public key) matching the client device 252 public key. More particularly, the virtual delivery appliance 253 first validates the connection lease signature and date, making sure that the broker 260 signature on the lease is valid (using the RoT 257 signed broker public key, since the virtual delivery appliance trusts the RoT) and that the lease has not expired. Moreover, the virtual delivery appliance 253 may verify that the connection lease includes the client device 252 public key, or a hash of the client device public key, in which case the virtual delivery appliance computes the hash of the client device public key. If the connection lease includes the matching client device 252 public key, then the virtual delivery appliance 253 confirms that the connection lease was sent from the client device for which it was created.

As a result, if a connection lease is stolen from the client device 252 and used from a malicious client device, the session establishment between the malicious client and the virtual delivery appliance 253 will not succeed because the malicious client device will not have access to the client private key, this key being non-exportable and stored in the hardware-backed key store 262.

The illustrated connection lease management infrastructure also advantageously allows for connection lease validation using a "reverse prepare for session" operation from the virtual delivery appliance 253 (e.g., a Citrix VDA, etc.), as a target resource location, to the Broker 260 (e.g., Citrix Virtual Apps and Desktops Broker), as noted above. This may be done in conjunction with the connection lease exchange that occurs between the client device 252 and the virtual delivery appliance 253, and utilizing signed responses from the broker 260 and virtual delivery appliance 253. These play a significant role for the resiliency, security, performance and user experience (UX) with respect to connection leasing.

Figure 9:
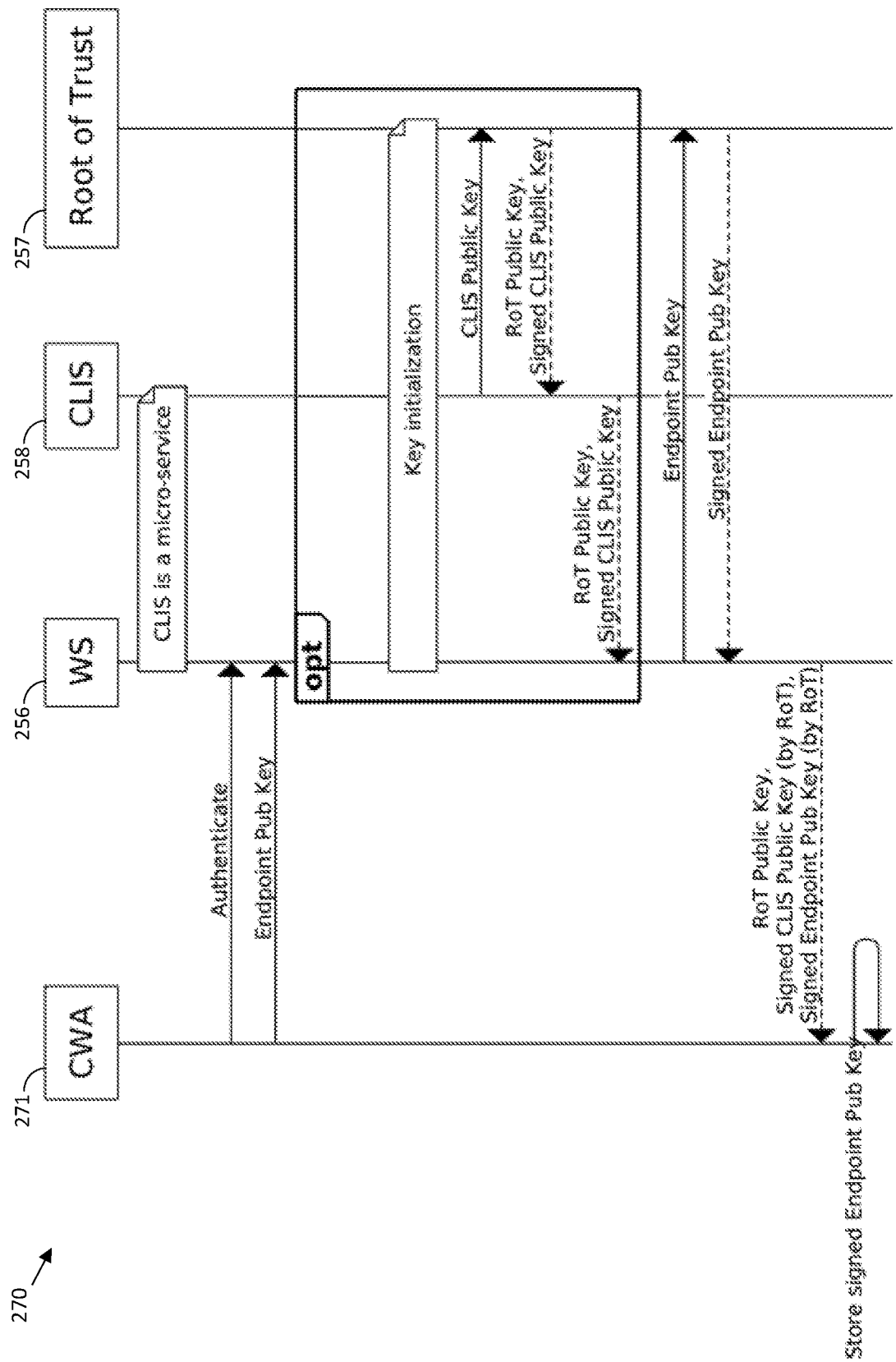
FIG. 9 is a sequence flow diagram of an example endpoint key bootstrapping implementation that may be performed within the systems set forth herein.

Turning now to FIG. 9, an example endpoint key authorization and bootstrapping process for the client device 252 which may occur prior to a connection lease sequence is now described with reference to the sequence flow diagram 270. The client device 252 first encrypts an authorization ("auth") token with an authorization token symmetric key that is also shared by the virtual delivery appliance 253. In the illustrated example, the client device or endpoint 252 connects to virtual sessions using CWA 271 (which may be web-based or native), which forwards the encrypted auth token to the cloud interface 256 (here Citrix Workspace—WS), along with its endpoint public key. In the illustrated example, the CLIS 258 is implemented as a micro-service, although other application architectures may be used in different embodiments. Upon a first authentication, an optional key initialization process may occur in which the CLIS 258 provides its public key to the RoT 257, which the RoT 257 signs with its own RoT private key and returns to the CLIS 258 along with its RoT public key, and the CLIS 258 forwards them both to the cloud interface 256. The cloud interface 256 forwards the received endpoint public key to the RoT 257, which it also signs with the RoT private key and returns to the cloud interface. The cloud interface then forwards the RoT public key, signed (by the RoT 257) CLIS public key, and signed (by the RoT) endpoint public key to the client device 252, which are then stored by CWA 271 for use in future connection requests.

Figure 10A:
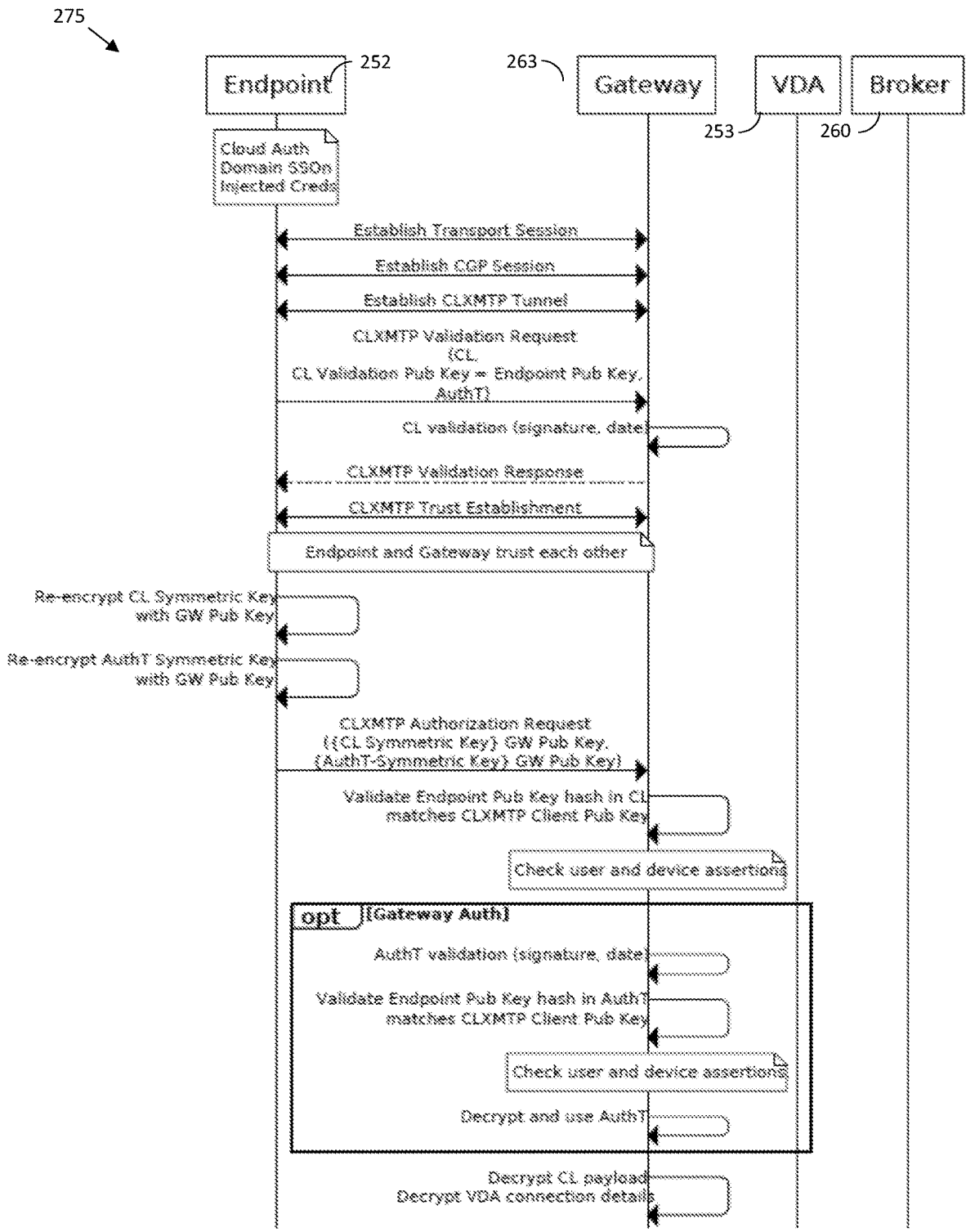
FIGS. 10A-10C are first, second, and third parts of an example sequence flow diagram of a connection lease connection sequence that may be performed within systems set forth herein.
Figure 10B:
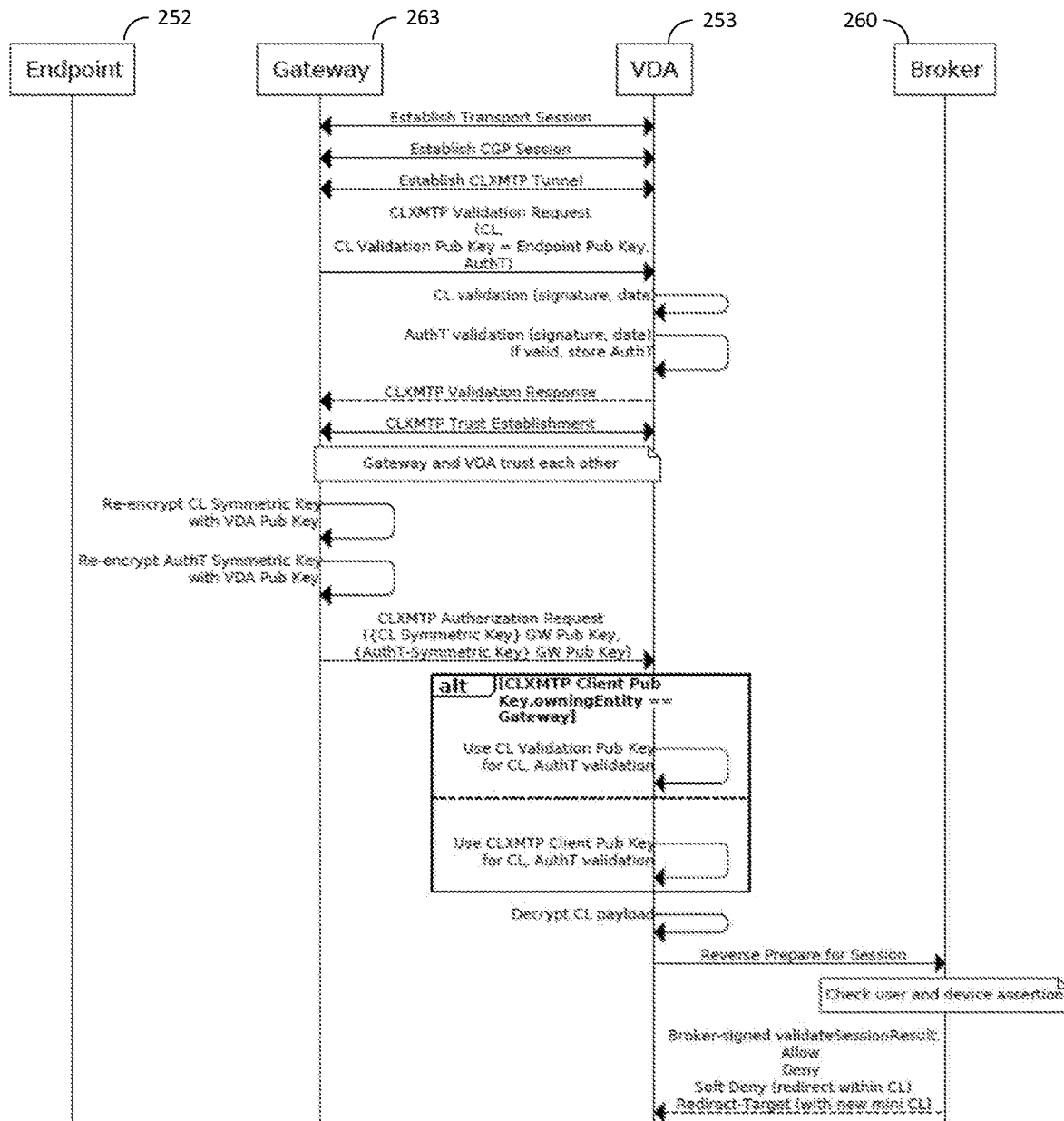
Figure 10C:
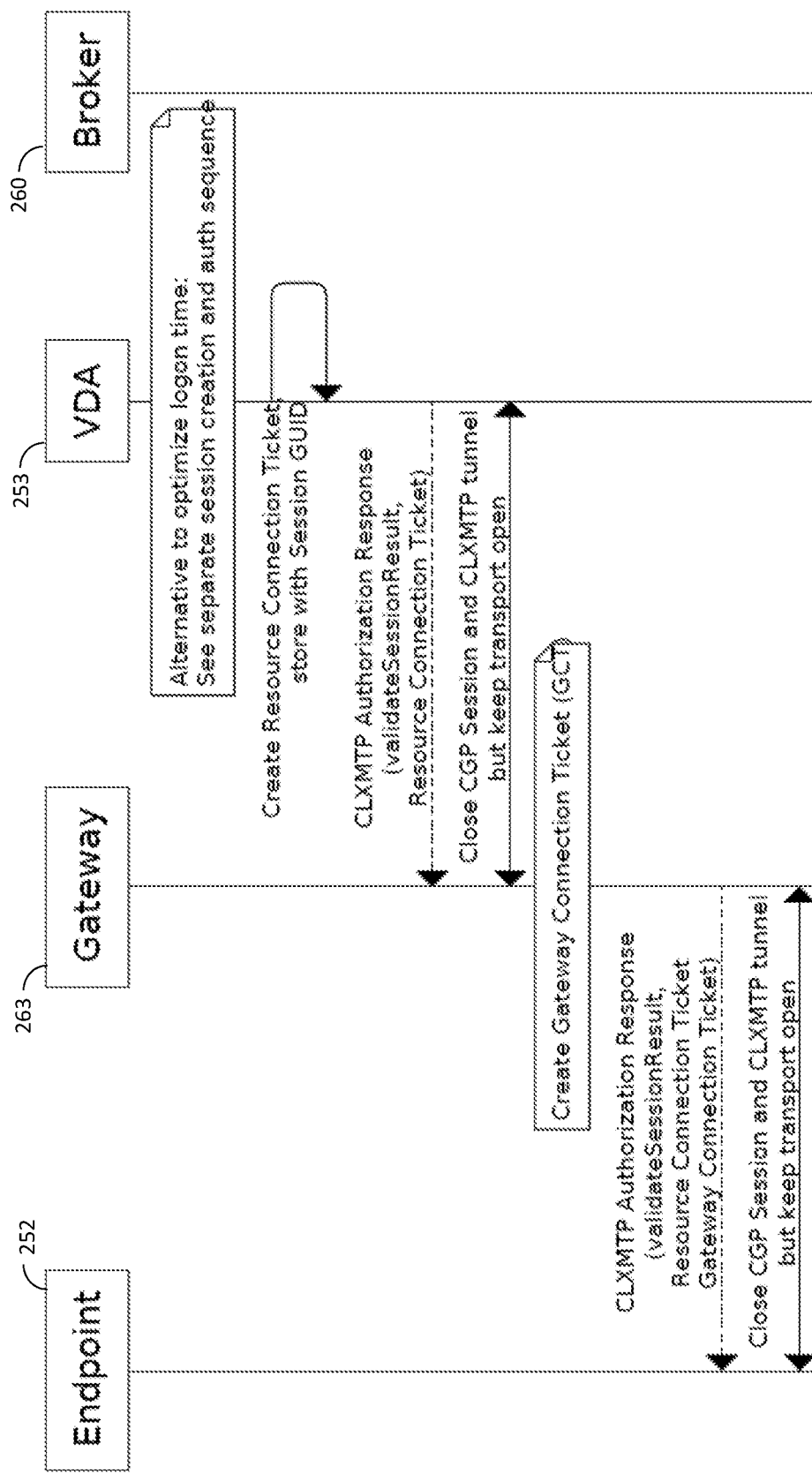

Referring now to the sequence flow diagram 275 of FIGS. 10A-10C, an example chain of trust establishment and connection lease validation/authentication process is now described. CWA at the client device or endpoint 252 first establishes the transport layer session 207 (e.g., TLS, TCP, EDT, DTLS, UDP, etc.) with the gateway appliance 263, and then a presentation layer session 208 (e.g., CGP) within the transport layer session, as discussed above with reference to FIG. 6. Moreover, the client device or endpoint 252 may then establish a connection lease exchange tunnel 209 within the presentation layer session 208, and exchange a connection lease exchange and mutual trust protocol (CLXMTP) with the gateway appliance 263. The client 252 then sends a CLXMTP validation request to the gateway appliance 263 by providing the connection lease, a connection lease validation public key, which will be explained further below, and an optional auth token. The gateway appliance 263 then validates the connection lease of the endpoint (e.g. checks the signature and date) and notifies the endpoint of the validation. The endpoint 252 and gateway appliance 263 then exchange CLXMTP "establish trust" requests and responses, which involve exchanging their signed public (by the RoT 257) keys, validating that they are signed by the RoT 257, and performing a standard challenge-response with nonce as previously described in step 7 of the flow of FIG. 8. At this point, assuming successful CLXMTP trust establishment, the endpoint 252 and the gateway appliance 263 trust each other. It should be noted that the CLXMTP trust establishment may also be performed before the CLXMTP validation request exchanging the connection lease. At this point, as part of a CLXMTP authorization request, the endpoint 252 can safely send to the gateway appliance 263 the connection lease symmetric key (encrypting the connection lease payload) and the auth token symmetric key (encrypting the auth token payload) by re-encrypting them with the gateway appliance 263 public key.

The gateway appliance 263 validates that the endpoint public key hash included in the connection lease matches the endpoint public key used in the CLXMTP protocol trust establishment as CLXMTP client public key. In other words, the gateway appliance 263 validates that the connection lease is properly used by the endpoint appliance 252 to which it was issued. As additional optional validations, the gateway appliance 263 may also check user and device assertions, e.g. based on the user and device identities included in the connection lease, the gateway may check if the user is still in good standing and the device has not been reported stolen. The gateway appliance 263 further decrypts a connection lease payload, which includes virtual delivery appliance 253 connection details, such as a list of virtual delivery appliances assigned to the particular endpoint 252, an order in which the endpoint is to request connections of the listed virtual delivery appliances, etc. In some embodiments, the gateway appliance 263 may also decrypt and use the auth token for gateway authentication, if desired. Similar to the additional connection lease validation steps described above, the gateway appliance 263 may perform checks that the auth token is not being misused, e.g. by comparing a hash of the endpoint public key included in the auth token with the endpoint public key used in the CLXMTP protocol trust establishment as CLXMTP client public key, and that the user and device assertions pass.

The above-described process is then repeated between the gateway appliance 263 and the virtual delivery appliance 253 to establish a transport layer session 207 (e.g., TLS, TCP, EDT, DTLS, UDP, etc.), presentation layer session 208 (e.g., CGP), and connection lease exchange tunnel 209 therebetween (FIG. 10B). The rest of the CLXMTP processes are almost identical to those previously described above in FIG. 10A with respect to the endpoint 252 and the gateway appliance 263, however now the gateway appliance 263 acts as a CXLMTP client, while the virtual delivery appliance 253 acts as a CLXMTP server. For example, once the gateway appliance 263 and the virtual delivery appliance 253 have established the connection lease exchange tunnel

209 and have established trust, the gateway appliance re-encrypts the connection lease symmetric key used to encrypt the connection lease payload and the auth token symmetric key used to encrypt the auth token with a virtual delivery appliance 253 public key, which are both provided to the virtual delivery appliance.

The virtual delivery appliance 253 also validates that the endpoint public key hash included in the connection lease, and also included in the optional auth token, matches that of the endpoint 252. An important detail is that in direct connections, where no gateway appliance 263 is involved, the virtual delivery appliance 253 uses the CLXMTP client public key, which is the same as the endpoint 252 public key, to validate the thumbprint in the connection lease and the auth token. However, in gateway connections, the CLXMTP client public key is actually the gateway appliance 263 public key, so the virtual delivery appliance 253 cannot use it for validation. Instead, connection lease validation pub key, which is equal to the endpoint 252 pub key is relayed from the endpoint 252 via the gateway appliance 263 to the virtual delivery appliance 253. So, in gateway connections, the virtual delivery appliance 253 uses the connection lease validation public key to validate the thumbprint in both the connection lease and the auth token. This is safe because the public key of the gateway appliance 263 is signed by the RoT and its owning entity included in the signed public key is well known, e.g. "Gateway". The RoT would not sign any other entity as "Gateway".

The virtual delivery appliance 253 then decrypts the connection lease payload, and sends the above-noted reverse prepare for session request to the broker 260 to initiate the connection lease validation. The broker 260 returns a validated session result, which may allow the sessions, deny the session, "soft" deny the session (requiring the endpoint to try again through another virtual delivery appliance), or redirecting the connection lease request to a particular target (e.g., a particular virtual delivery appliance).

The virtual delivery appliance 253 may then create and store a resource connection ticket (or virtual delivery appliance resource connection ticket), which is stored along with a session Globally Unique Identifier (GUID). The resource connection ticket allows HDX to later connect to a pre-authorized session, as will be further described below. The resource connection ticket also points to the stored and validated auth token at the virtual delivery appliance 253. It should be noted that in some embodiments, as a logon time optimization, immediately upon return from the above-noted reverse prepare for session request to the broker 260, the virtual delivery appliance 253 could use information in the connection lease (e.g. published resource key) and the auth token to start the virtual session and log the user in. The virtual session creation and SSON process will be further described below in reference to FIGS. 12A and 12B. The virtual delivery appliance then sends a connection authorization response along with the resource connection ticket to the gateway appliance 263 and closes the presentation layer session 208 and the connection lease exchange tunnel 209, while keeping the transport layer session 207 open. Similarly, the gateway appliance 263 creates a gateway connection ticket, and provides the connection authorization response, the gateway connection ticket and the resource connection ticket to the client device 252 and closes the presentation layer session 208 and the connection lease exchange tunnel 209 therebetween (while keeping the transport layer session 207 open). Advantageously, the gateway appliance 263 does not have to store the gateway connection ticket, because the gateway connection ticket is self-contained as will be further discussed below.

Figure 11:
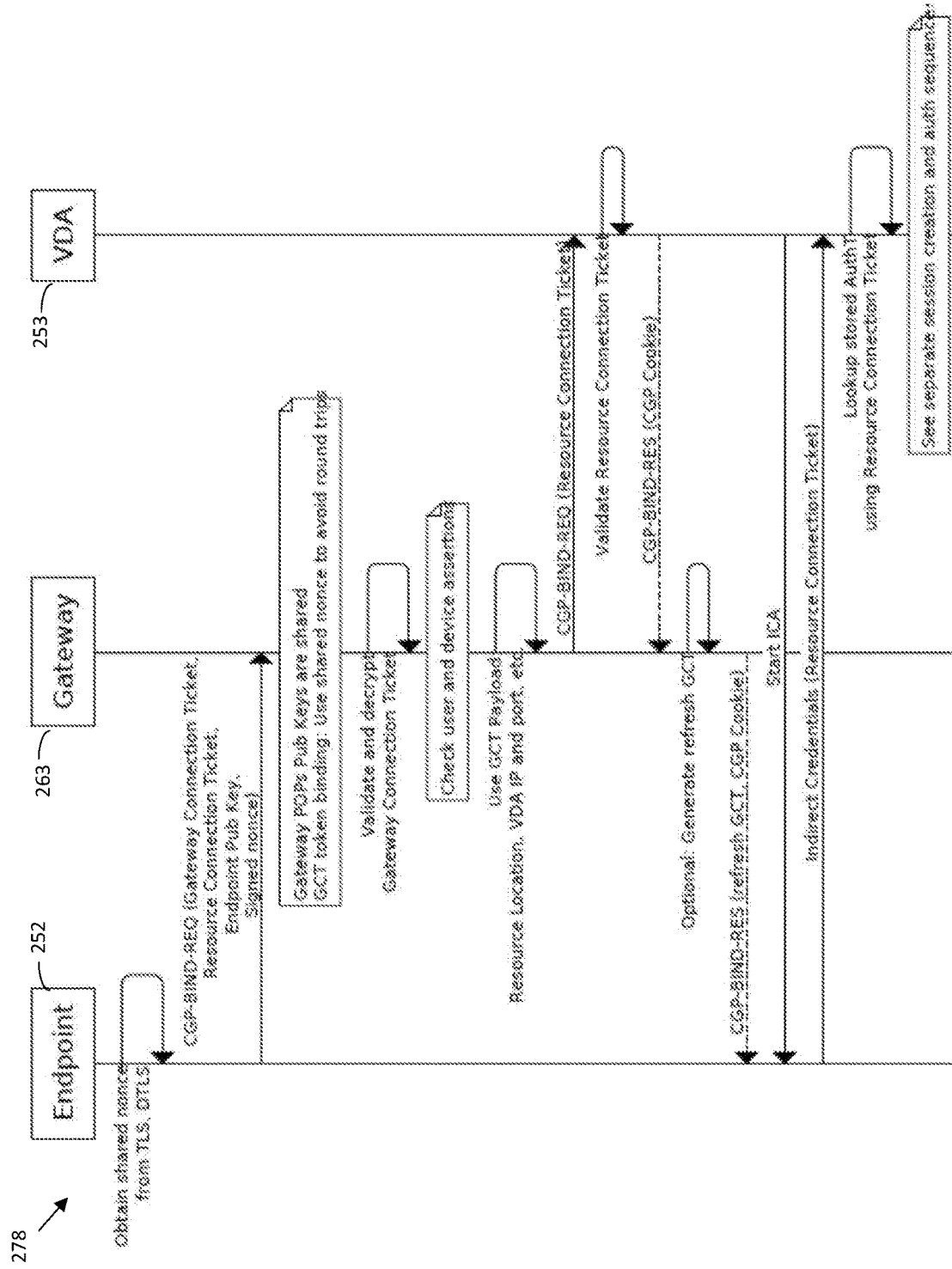
FIG. 11 is a sequence flow diagram illustrating further connection lease sequence operations in accordance with an example embodiment.

Referring additionally to the sequence flow diagram 278 of FIG. 11, the endpoint 252 may then establish a connection with the virtual delivery appliance 253 via the gateway appliance 263, just like with an ICA file, except that gateway connection ticket and resource connection ticket are used to authorize the connection at the gateway appliance 263 and the virtual delivery appliance 253 respectively. To initiate a virtual session, the endpoint 252 sends a request along with the gateway connection ticket and the resource connection ticket to the gateway appliance 263, which the gateway appliance 263 validates, e.g., based on the gateway connection ticket signature and payload, and the public key of a PoP associated with the gateway appliance 263, as will be discussed further below. As an optimization, a shared secret from the transport layer (TLS, DTLS) can be used as a nonce for secure token binding of the gateway connection ticket without further revisioning CGP to support 3-way handshake with nonce between the endpoint 252 and the gateway appliance 263 and affecting logon time, for example. The gateway appliance 263 may also check user and device assertions as previously described.

Upon validation, the gateway appliance 263 sends the request to the virtual delivery appliance 253 along with the resource connection ticket. The virtual delivery appliance 253 then validates the resource connection ticket, and sends a response back to the gateway appliance 263, which in turn forwards it to the endpoint 252. Advantageously, this process may reuse the already established transport layer sessions 207 open, in particular, the transport layer session 207 between the endpoint 252 and the gateway appliance 263 as well as the transport layer session 207 between the gateway appliance 263 and the virtual delivery appliance 253. However, it should be noted that in some scenarios the transport layer session 207 may not be reused, e.g. in case of failover from one instance of gateway appliance 263 to another. The ICA connection with the virtual delivery appliance 253 then starts, and the endpoint 252 forwards its credentials (including the resource connection ticket) to the virtual delivery appliance 253. The virtual delivery appliance 253 then dereferences the resource connection ticket, and decrypts the auth token symmetric key with its private key, and also decrypts the auth token with its auth token symmetric key shared with the endpoint 252.

Figure 12A:
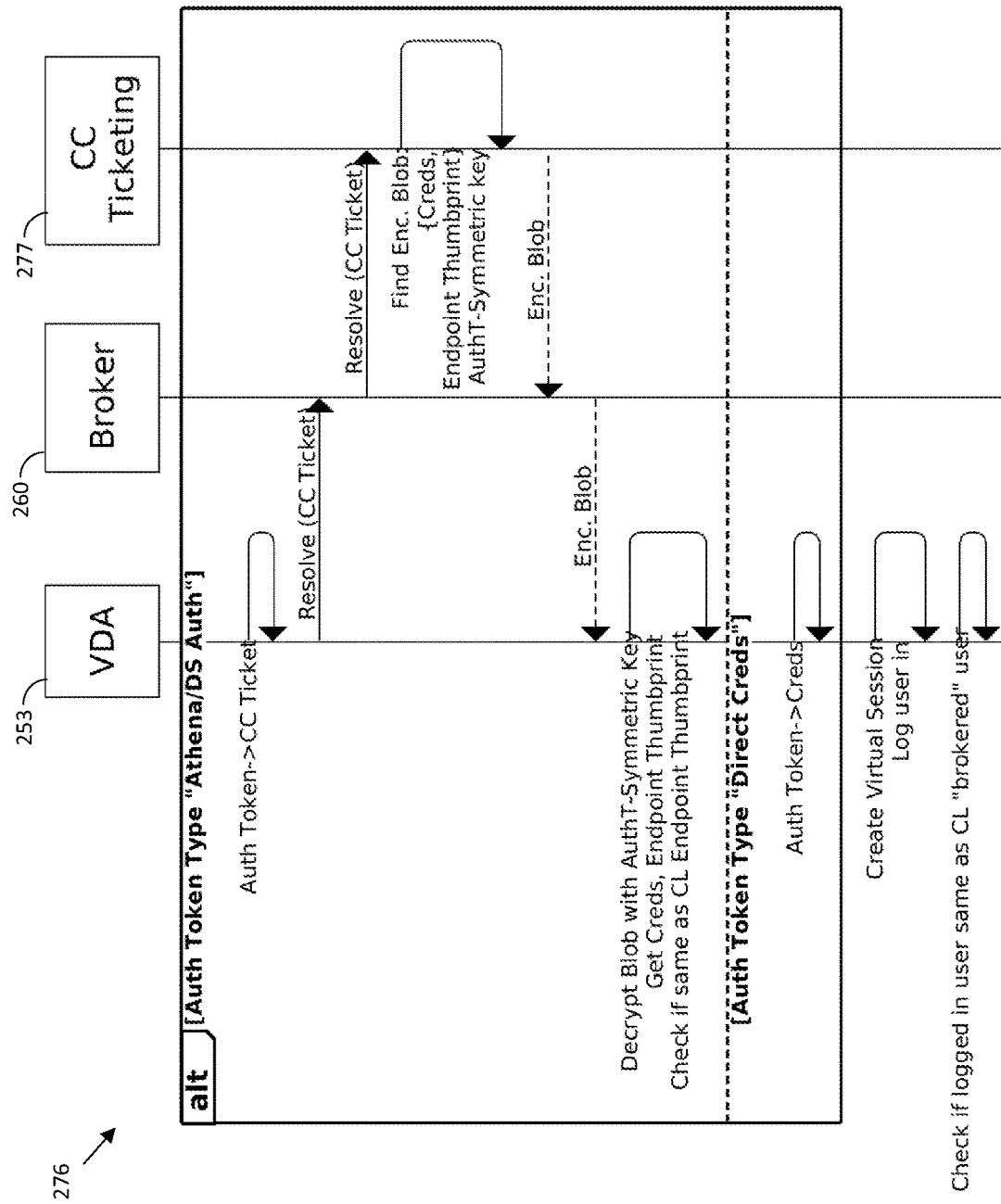
FIGS. 12A and 12B are a sequence flow diagram of an example virtual delivery appliance session creation and authentication with single sign-on (SSOn) that may be performed within the systems set forth herein.
Figure 12B:
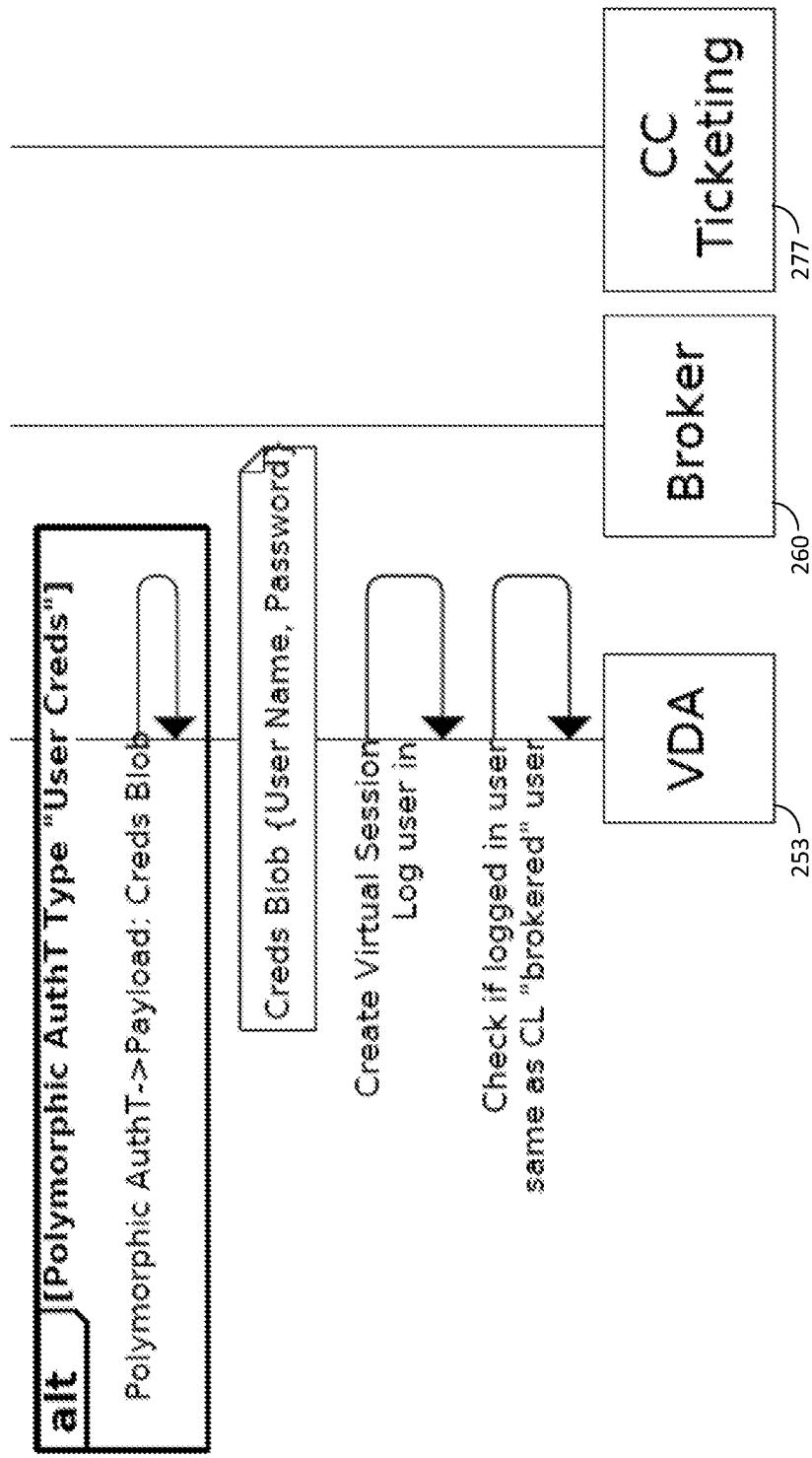

Referring additionally to the sequence flow diagram 276 of FIGS. 12A and 12B, an example session creation and authentication flow in now described which may be performed by the virtual delivery appliance 253. Once the auth token is decrypted, it may be converted to a Citrix Cloud (CC) ticket to be resolved by a CC ticketing agent 277 of the broker 260. The CC ticketing agent finds the respective encrypted credentials, which may be stored in blob format. The blob is then returned to the virtual delivery appliance 253 via the broker 260. The virtual delivery appliance 253 then decrypts the blob with the auth token symmetric key to obtain the credentials. The virtual delivery appliance 253 then creates the virtual session and logs the user in using the decrypted credentials for SSON. The virtual delivery appliance 253 also checks if the logged in user is the same as the connection lease "brokered" user.

In some embodiments, more than one type of connection lease may be used. These may include resource connection leases (e.g. identifying a published resource), component connection leases for a resource locations (e.g. identifying addresses of gateway appliance 263, addresses of virtual delivery appliance 253), components connection leases for the resource locations order, etc. Also, as mentioned above with respect to FIG. 7, in some embodiments a direct connection may be established between the client device or endpoint 252 and the virtual delivery appliance 253. In such case, the gateway connection ticket generation and associated gateway validation operations would be omitted from the above-described connection lease sequence flow.

Referring again to the example embodiment of FIG. 6, in those cases where the broker computing device 260 returns a redirect-target or soft-deny, the client device 252 either directs its connection lease request to a particular virtual delivery appliance 253b specified by the broker computing device (for a redirect-target), or to the next assigned virtual delivery appliance listed in its connection lease, as shown. In such cases, the above-described process of establishing transport layer sessions 207, presentation layer sessions 208, and connection lease exchange tunnels 209 between the client device 252, gateway appliance 263, and (a new) virtual delivery appliance 253 would again be performed responsive to the redirect-target or soft-deny from the broker. However, as an optimization, when the connection is through a gateway appliance 263, as illustrated in FIG. 6, the gateway appliance 263 may service the redirect-target or soft-deny operations instead of forwarding them to the client device 252. In particular, the gateway appliance 263 may perform again the above-described process of establishing transport layer sessions 207, presentation layer sessions 208, and connection lease exchange tunnels 209 between the gateway appliance 263 and (a new) virtual delivery appliance 253 but without terminating the already established transport layer sessions 207, presentation layer sessions 208, and connection lease exchange tunnels 209 between the client device 252 and the gateway appliance 263. This approach advantageously accelerates the connection lease resolution process.

Figure 13:
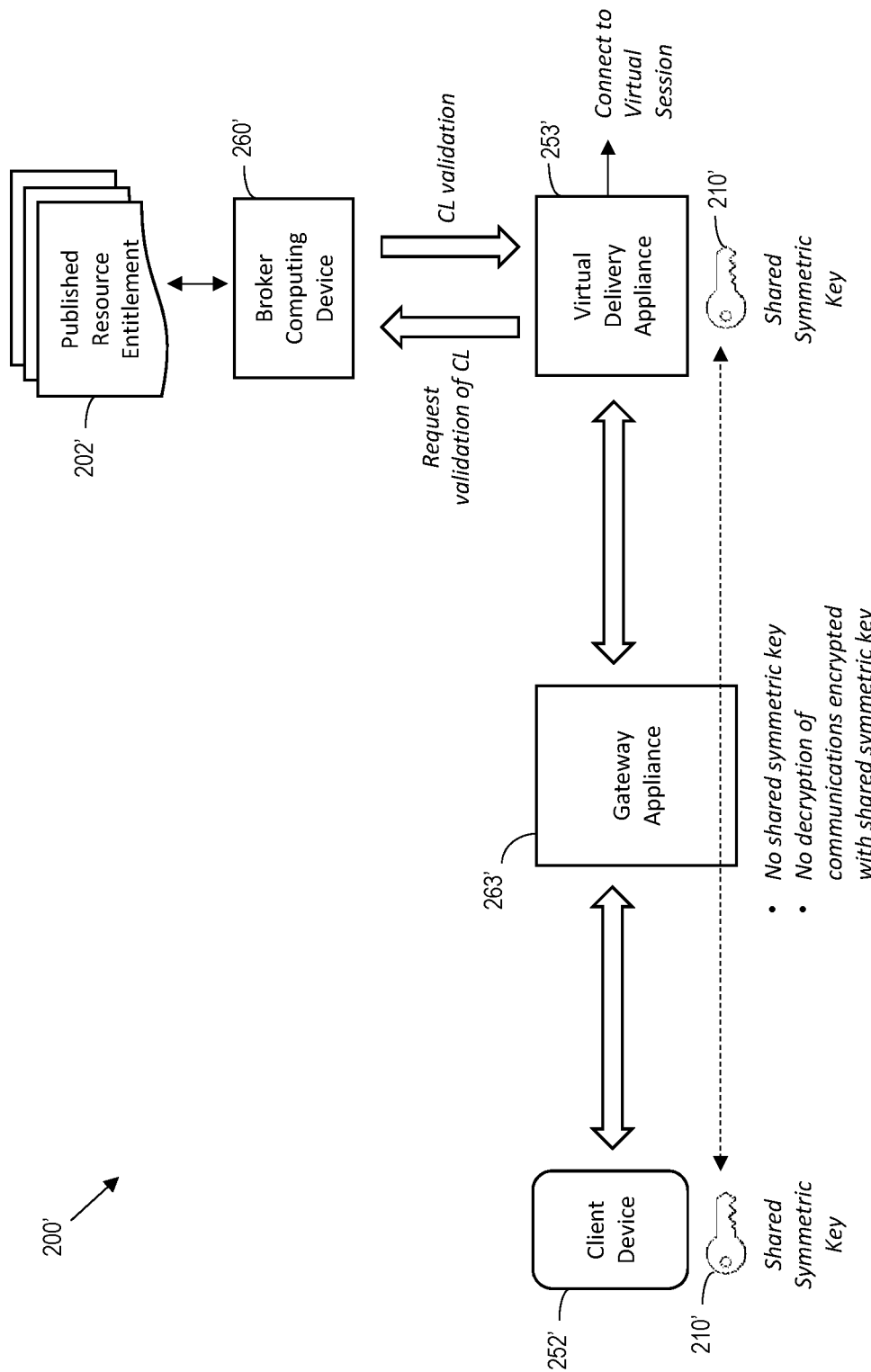
FIG. 13 is a schematic block diagram of a computing system similar to that of FIG. 6 providing black cloud support for a gateway appliance in an example embodiment.

Use of the connection lease exchange tunnels 209 also provides support for "black cloud" or constrained data egress support with respect to the gateway appliances 263. As noted above, a gateway appliance 263 in the middle between the client device 252 and virtual delivery appliance 253 might ordinarily be able to access the traffic between client device and virtual delivery appliance, leading to privacy and security concerns. However, with the connection lease exchange tunnels 209, exposure of such data at the gateway appliances may be avoided, as will now be described with reference to the example system 200' shown in FIG. 13.

More particularly, the client device 252' and the virtual delivery appliance 253' share a symmetric encryption key 210' and encrypt data communications exchanged therebetween with the symmetric encryption key. That is, the symmetric key 210' is known to the client device 252' and the virtual delivery appliance 253', but not the gateway appliance 263'. As such, the gateway appliance 263' is able to relay the encrypted communications between the client device 252' and the virtual delivery appliance 253', but it is unable to decrypt the encrypted communications, thereby preventing the gateway appliance from seeing sensitive data.

In other words, this use of selective encryption allows only the client device 252' and virtual delivery appliance 253' to see the sensitive data. Such data may include credentials, specific virtual channels for biometric authentication, audio, video, etc. However, other types of communications between the client device 252' and virtual delivery appliance 253' may be left unencrypted, such as an app flow virtual channel (e.g., for HDX telemetry), etc.

Various approaches may be used to provide the symmetric key 210' to the client device 252' and the virtual delivery appliance 253'. A first approach is to embed a public key of the virtual delivery appliance 253' in the connection lease. Still another option is to utilize the validateSessionResult with signed "allow" from the broker computing device 260' to the virtual delivery appliance 253' (see FIG. 10B) to also include the virtual delivery appliance public key. Still another option is that the virtual delivery appliance 253' public key may be signed with the broker 260' private key during the reverse prepare for session, and the connection lease includes the broker 260' public key so that the client device 252' can validate the signature of the virtual delivery appliance public key.

It is also possible to have the RoT 257 sign the public key of the virtual delivery appliance 253', so it would not be required for the connection lease to include the broker computing device 260' public key. Since the client device 252' has and trusts the RoT 257 public key, it can validate the signature of the virtual delivery appliance 253' public key. The client device 252' can also check the key type of the signed virtual delivery appliance 253' public key to make sure it is the proper type. Otherwise, a malicious gateway appliance 263' might provide its signed public key to the client device 252' and pretend to be a virtual delivery appliance 253'. Through authentication on the backend, use of the RoT 257 ensures that only a virtual delivery appliance 253' public key can be of a virtual delivery appliance key type before signing it.

In any event, the client device 252' encrypts credentials or other sensitive information with the symmetric key, and sends the encrypted data to the virtual delivery appliance 253' along with the symmetric key encrypted with virtual delivery appliance public key. This allows the virtual delivery appliance 253' to accordingly obtain the symmetric key by decrypting it using its virtual delivery appliance 253' private key and then, using the symmetric key, to decrypt the sensitive information.

Another approach is for the virtual delivery appliance 253' to provide the symmetric key 210' to the client device 252'. More particularly, the connection lease may include not only a hash of client device 252' public key (thumbprint), but also the client device public key itself. The virtual delivery appliance 253' creates the symmetric key 210', and sends symmetric key-encrypted data to the client device 252' along with the symmetric key encrypted with the client device 252' public key. The client device 252' then decrypts the symmetric key using its client device 252' private key and, using the symmetric key, decrypts the data.

As noted above, virtual channels may be used for communicating different types of data between the virtual delivery appliance 253', gateway appliance 263', and client device 252'. However, it may be desirable that such data not be accessible by any entity other than the gateway appliance (e.g., App Flow virtual channel with HDX Insights). In this case, the virtual delivery appliance 253' may create the symmetric key 210', and send encrypted data to both the gateway appliance 263' and client device 252' along with the symmetric key encrypted with the public key of the gateway appliance 263'. As such, only the gateway appliance is able to decrypt this data.

The symmetric key used to encrypt the connection lease payload may be different from the symmetric key used to encrypt communications between the client device 252' and the virtual delivery appliance 253'. The connection lease symmetric key becomes known to gateway appliance 263' (after trust establishment), because the gateway appliance 263' needs to decrypt and processes the connection lease payload. However, the communications-encrypting symmetric key 210' is not known to the gateway appliance 263'.

Figure 14:
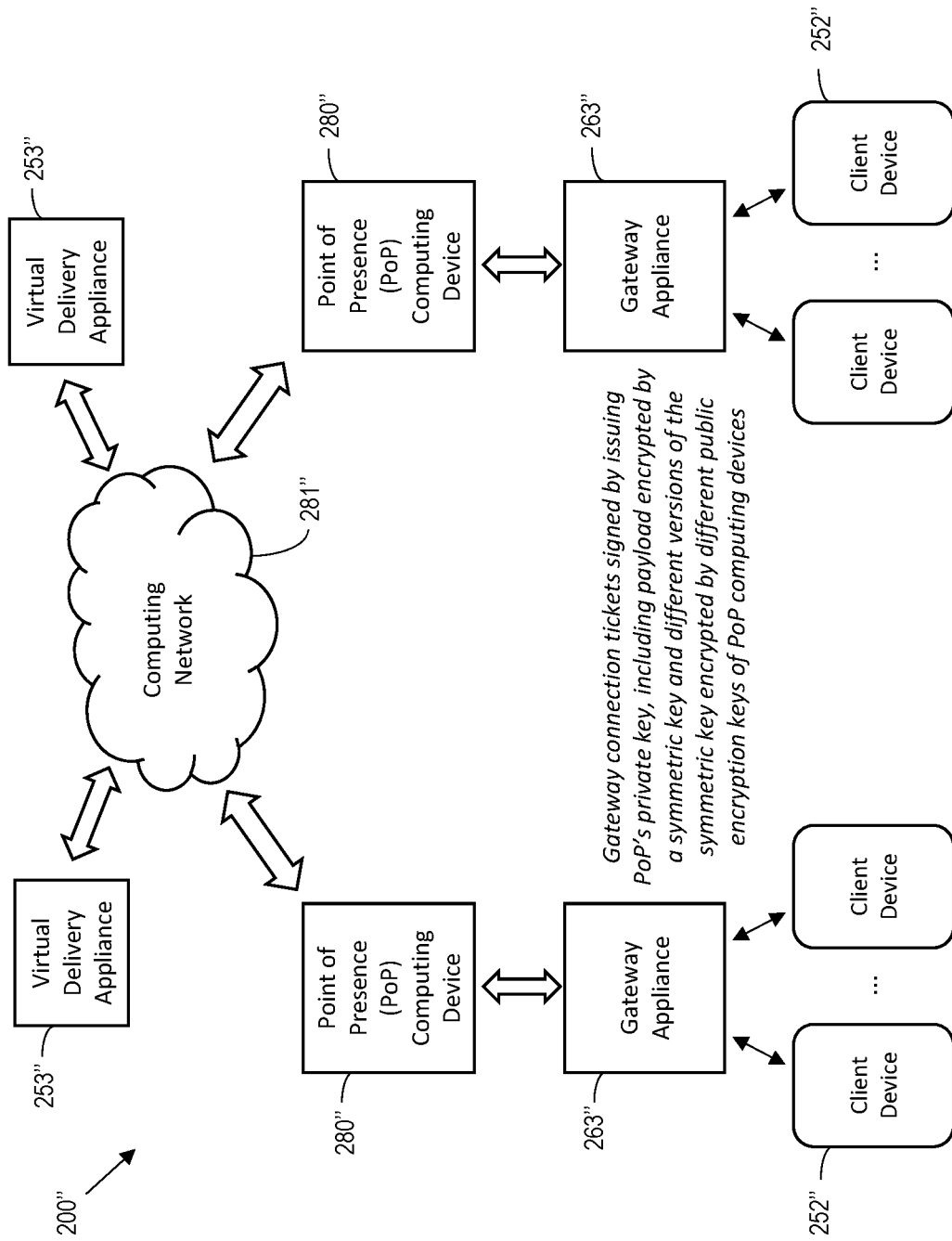
FIG. 14 is a schematic block diagram of a computing system similar to that of FIG. 6 providing Point of Presence (PoP) resiliency failover features in accordance with an example embodiment.

Turning to FIG. 14, another example implementation of the system 200" is now described which provides for resilient secure gateway appliance 263" failover. As noted above, gateway appliances 263" have multiple Points of Presence (POPs) 280" for accessing a computing network 281" (e.g., cloud computing infrastructures such as AWS, Azure, etc.) for performance, load-balancing and resiliency. By way of example, Citrix Gateway service provides secure remote access to virtual apps and desktops, supporting workforce productivity and giving employees the flexibility to work from anywhere, while keeping apps and information secure. Citrix Gateway service automatically routes end-user traffic to a global Citrix Gateway service PoP. End users utilize the PoP location that will provide the best experience, regardless of where the Citrix Cloud control plane geo-selection or location of the applications being accessed is, to ensure the best experience. Both Microsoft Azure PoPs and Amazon Web Services (AWS) are used.

In the illustrated example, the PoP computing devices 280" have respective public/private encryption key pairs associated therewith, and the gateway appliances 263" are configured to relay communications between client devices 252" and virtual delivery appliances 253", as discussed above, via the computing network 281" through the PoP computing devices. Moreover, the gateway appliances 263" are also configured to generate gateway connection tickets including a payload encrypted with a symmetric encryption key, and a plurality of different versions of the symmetric key encrypted with different public encryption keys of the PoP computing devices 280" for routing the client communications through the different PoP computing devices. The gateway connection tickets are also signed by the issuing PoP computing devices 280" private key. As a result, all of the PoP computing devices 280" will be able to perform signature validation and relay communications for different gateway appliances 263" if one of the PoP computing devices goes offline or is otherwise unavailable.

In an example embodiment, the gateway appliances 263" may generate self-contained encrypted gateway connection tickets (GCTs) for enhanced resiliency, load-balancing and security. This may be valid in any gateway service region (assigned to respective PoP computing devices 280", for example) and independent of a shared STA Service, which may be subject to failures. For example, PoP N may create the GCT contents, generate a symmetric key, encrypt the GCT payload with the symmetric key, then encrypt the symmetric key with every other PoP's public key. PoP N can then sign the GCT. Thus, the GCT will contain an array of [{Symmetric Key} Gateway PoP Public Key, . . . ], and every other PoP 280" will be able to validate the signature and decrypt it using its PoP 280" private key once presented by a client device or endpoint 252".

In accordance with one implementation, the PoP computing devices 280" may share their public keys between one another. Alternatively, a global gateway public/private key pair may be used. The GCT may include one or more of the following: creation time; expiration time; owner; an array of [{Symmetric Key} Gateway POP Public Key, . . . ]; information that would otherwise be pointed to by a STA ticket in the STA Service memory blob, e.g. VDA IP address, port, protocol, etc., which helps in re-establishing a connection in case of a transport break; any additional info used for identifying and preserving the connection lease exchange tunnel 209, presentation layer session 208, etc. In some implementations, an embedded auth token may also be used, so a client device 252" does not have to resend credentials in subsequent tunnels.

In some implementations, pre-authorization may be used for securing secondary network tunnels with optimal transport reuse or hand-over. For a pre-authorization connection, separate tunnels 209 may be used (e.g., over the same transport 207) for authorization and payload (e.g. virtual session delivery data) communications. Moreover, credentials may be sent ahead of time (which are unusable by the gateway appliance 263" and virtual delivery appliances) to be used only after successful connection lease authorization. Re-using the same transport for the authorization and payload tunnels results in better logon performance, as multiple transport layer sessions 207 need not be opened.

In CWA implementations, both web and native versions of the application may be utilized by client devices 252". More particularly, a transition from a first app (e.g., Web-based CWA) to a second app (e.g., Native CWA) on the client device 252", where gateway connection tickets and the virtual delivery appliance connection ticket (also referred to as a resource connection ticket herein) are handed over from the first app to the second app. The first app performs the authorization and obtaining of the gateway connection ticket and resource connection ticket. In the case of HDX, the second app performs the HDX launch (and subsequently sends HDX payload) using the gateway connection ticket and the resource connection ticket. Resource connection tickets typically are not reusable between different virtual delivery appliances 253" (although they may be in some embodiments if desired). However, gateway connection tickets may be reusable between gateway instances to provide for ready failover between different gateway 263" instances.

By way of example, some users may use Web CWA for better Workspace Store UX, but perform an HDX launch via the native CWA for better session performance. Furthermore, gateway connection tickets and resource connection tickets established over Web CWA (without compromising restricted access to CLs and public/private key pairs accessible to Web CWA) may be then securely sent over and reused by Native CWA for HDX establishment. As such, there is no reliance on sending and exposing sensitive info, e.g., complete ICA files, on insecure firewall ports or protocol handlers to orchestrate a transition.

Figure 15:
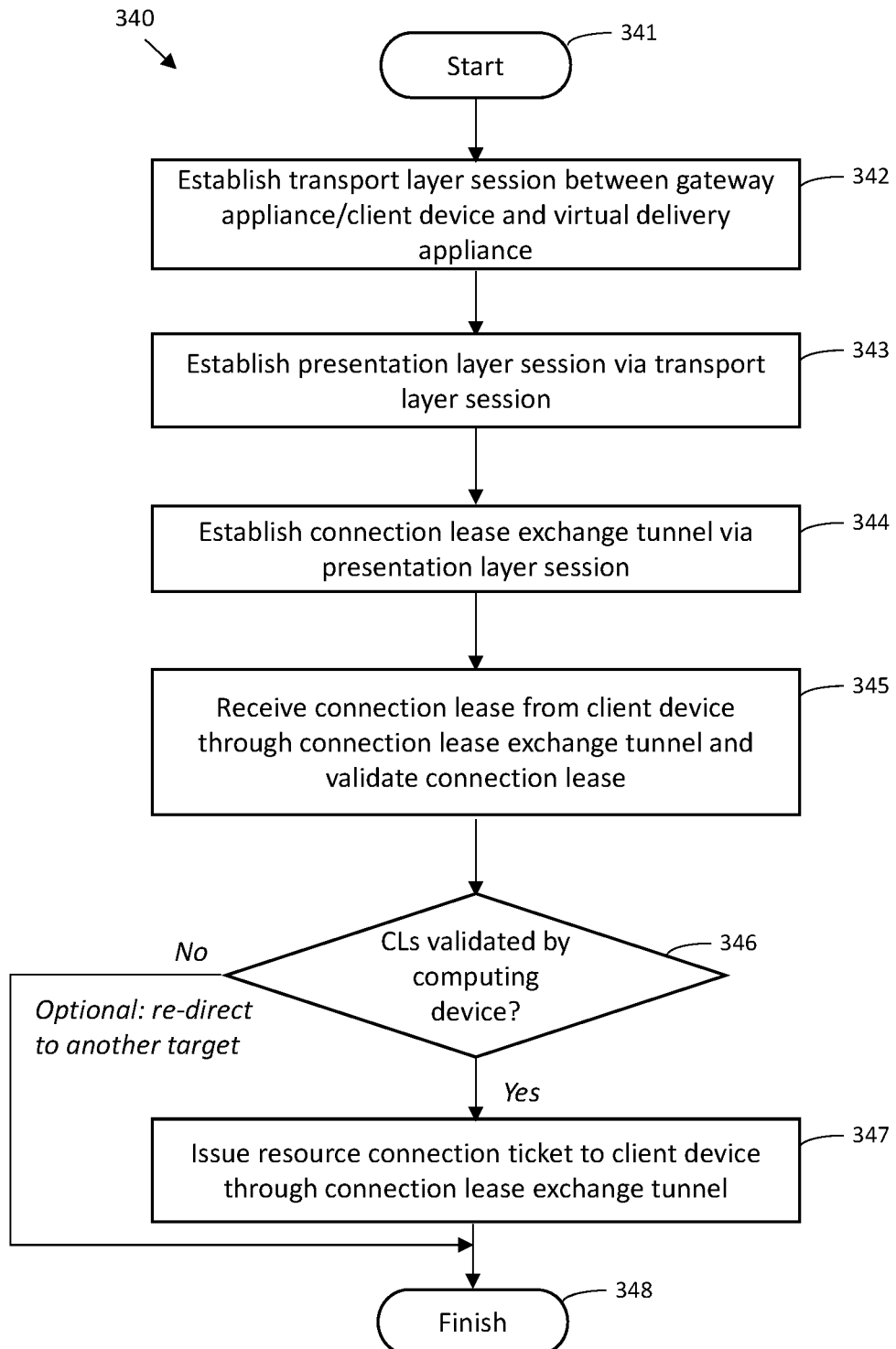
FIG. 15 is a flow diagram illustrating example method aspects associated with the system of FIG. 6.

Referring now to the flow diagram 340 of FIG. 15, example method aspects corresponding to the system 200 are now described. Beginning at Block 341, the method illustratively includes establishing a transport layer session 207 between the gateway appliance 263 and virtual delivery appliance 253, at Block 342, and establishing a presentation layer session 208 between the gateway appliance 263 and the virtual delivery appliance 253 via the transport layer session, at Block 343. The method further illustratively includes establishing a connection lease exchange tunnel 209 between the gateway appliance 263 and the virtual delivery appliance 253 via the presentation layer session 208, at Block 344, and receiving, at the virtual delivery appliance 253, a connection lease from the client device 252 via the gateway appliance 263 through the connection lease exchange tunnel 209, at Block 345. Upon validating the connection lease (Block 346), a resource connection ticket may be issued from the virtual delivery appliance 253 to the client device 252 through the connection lease exchange tunnel responsive to the validation (Block 347). As discussed further above, in lieu of an allowance a redirect-target or soft-deny response may be provided. In addition, the above-described steps may also be used to similarly establish transport layer sessions 207, presentation layer sessions 208, and connection lease exchange tunnels 209 between the client device 252 and gateway appliance 263, or in embodiments without a gateway appliance 263 between the client device 252 and the virtual delivery appliance 253 directly (see FIG. 7). The method of FIG. 15 illustratively concludes at Block 348.

Figure 16:
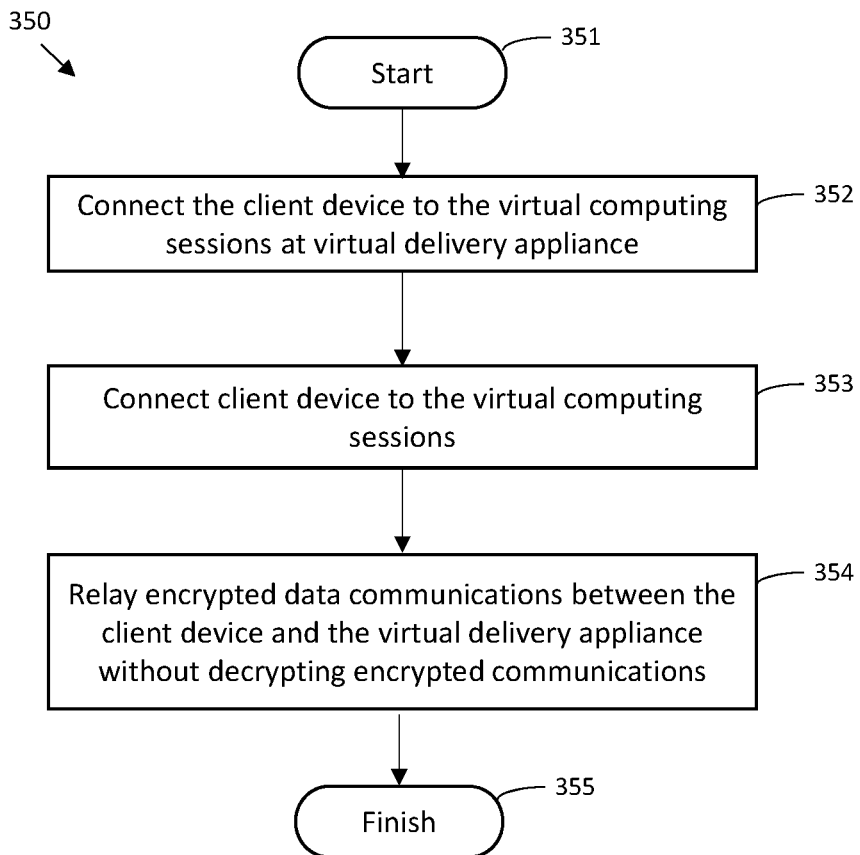
FIG. 16 is a flow diagram illustrating example method aspects associated with the system of FIG. 13.

Referring now to the flow diagram 350 of FIG. 16, example method aspects corresponding to the system 200' are now described. Beginning at Block 351, the method illustratively includes remotely accessing virtual computing sessions from a client device 252', at Block 352, and at a virtual delivery appliance 253', connecting the client device to the virtual computing sessions, with the client device and the virtual delivery appliance sharing a symmetric encryption key 210' and encrypting data communications exchanged therebetween with the symmetric encryption key, at Blocks 353-354. As discussed further above, the gateway appliance 263' accordingly relays the encrypted communications between the client device 252' and the virtual delivery appliance 253', yet while being unable to decrypt the encrypted communications, at Block 354. The method of FIG. 16 illustratively concludes at Block 355.

Figure 17:
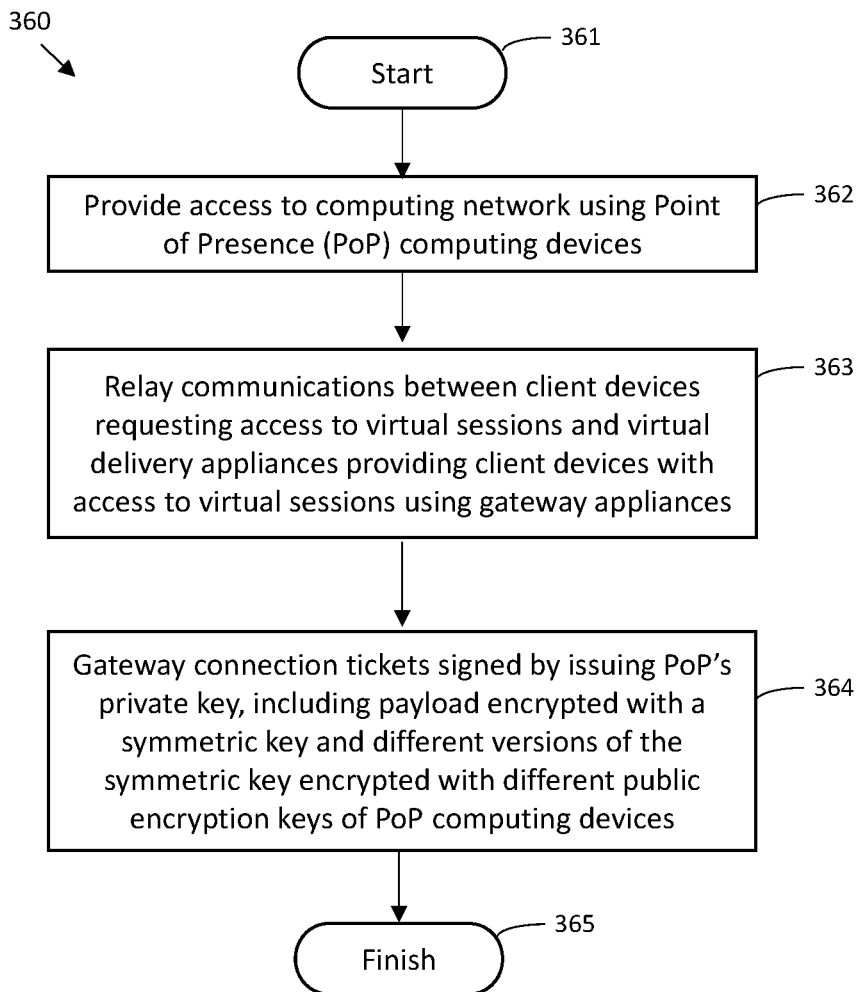
FIG. 17 is a flow diagram illustrating example method aspects associated with the system of FIG. 14.

Referring now to the flow diagram 360 of FIG. 17, example method aspects corresponding to the system 200" are now described. Beginning at Block 361, the method illustratively includes providing access to a computing network 281" using a plurality of PoP computing devices 280", at Block 362. The method further illustratively includes relaying communications between client devices 252" requesting access to virtual sessions and virtual delivery appliances 253" providing the client devices with access to the virtual sessions using a plurality of gateway appliances 263", where the gateway appliances 263" are routing client device communications through the PoP computing devices 280" (Block 363). The method also illustratively includes, at the gateway appliances 263", generating gateway connection tickets signed by the issuing PoP computing device 280" private key, including a payload encrypted with a symmetric encryption key, and a plurality of different versions of the symmetric key encrypted with different public encryption keys of the PoP computing devices 280" to permit routing of the client communications through the different PoP computing devices, at Block 364, as discussed further above. The method of FIG. 17 illustratively concludes at Block 365.

As will be appreciated by one of skill in the art upon reading the disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A method comprising:
    at a gateway appliance, relaying communications between client devices requesting access to virtual sessions and virtual delivery appliances providing the client devices with access to the virtual sessions;
    at the gateway appliance, routing client device communications through a plurality of Point of Presence (PoP) computing devices configured to provide access to at least one computing network based upon gateway connection tickets, the PoP computing devices having respective public/private encryption key pairs associated therewith, and
    at the gateway appliance, generating the gateway connection tickets including a payload encrypted with a symmetric encryption key, and a plurality of different versions of the symmetric key encrypted with different public encryption keys of the PoP computing devices so that the PoP computing devices may use their private encryption keys to decrypt the version of the symmetric key encrypted with their public encryption keys, use the decrypted symmetric key to decrypt the payload, and permit routing of the client communications based upon the decrypted payload of the gateway connection tickets.

2. The method of claim 1 wherein the gateway connection tickets are further signed by private encryption keys of the PoP computing devices.

3. The method of claim 1 further comprising, at the gateway appliance, exchanging authorization and virtual session delivery data of the client communications using separate tunnels over a common transport layer session.

4. The method of claim 1 wherein the gateway connection tickets further comprise an expiration time after which the gateway appliance will no longer permit routing of the client communications.

5. The method of claim 1 wherein the gateway connection tickets further comprise a creation time, and further comprising, at the gateway appliance, ceasing permitting routing of the client communications for creation times older than a threshold age.

6. The method of claim 1 wherein the gateway connection tickets further comprise an authentication token so that the client devices do not have to resend login credentials after establishing a connection with a gateway appliance.

7. The method of claim 1 wherein the payloads of the gateway connection tickets comprise at least one of a virtual delivery appliance Internet Protocol (IP) address, fully qualified domain name (FQDN), and a network port number.

8. The method of claim 1 further comprising, at the gateway appliance, authorizing connections from the client devices to the virtual delivery appliances by verifying the signatures of the gateway connection tickets and an expiration time of the gateway connection tickets.

9. The method of claim 1 further comprising, at the gateway appliance, recovering the payload using the symmetric key responsive to the verification of the signatures.

10. A computing system comprising:
    a plurality of Point of Presence (PoP) computing devices configured to provide access to at least one computing network, the PoP computing devices having respective public/private encryption key pairs associated therewith; and a plurality of gateway appliances configured to
    relay communications between client devices requesting access to virtual sessions and virtual delivery appliances to provide the client devices with access to the virtual sessions, the gateway appliances routing client device communications through the PoP computing devices based upon gateway connection tickets, and
    generate the gateway connection tickets including a payload encrypted with a symmetric encryption key, and a plurality of different versions of the symmetric key encrypted with different public encryption keys of the PoP computing devices;
wherein the PoP computing devices are further configured to use their private encryption keys to decrypt the version of the symmetric key encrypted with their public encryption keys, use the decrypted symmetric key to decrypt the payload, and permit routing of the client communications based upon the decrypted payload of the gateway connection tickets.

11. The computing system of claim 10 wherein the gateway connection tickets are further signed by private encryption keys of the PoP computing devices.

12. The computing system of claim 10 wherein the PoP computing devices are configured to access the public encryption keys of the other PoP computing devices from a shared database.

13. The computing system of claim 10 wherein the PoP computing devices are configured to exchange their public encryption keys between one another.

14. The computing system of claim 10 wherein the at least one computing network comprises a cloud computing network.

15. A gateway appliance comprising:
a memory and a processor configured to cooperate with the memory to
    relay communications between client devices requesting access to virtual sessions and virtual delivery appliances providing the client devices with access to the virtual sessions,
    route client device communications through a plurality of Point of Presence (PoP) computing devices configured to provide access to at least one computing network based upon gateway connection tickets, the PoP computing devices having respective public/private encryption key pairs associated therewith, and
    generate the gateway connection tickets including a payload encrypted with a symmetric encryption key, and a plurality of different versions of the symmetric key encrypted with different public encryption keys of the PoP computing devices so that the PoP computing devices may use their private encryption keys to decrypt the version of the symmetric key encrypted with their public encryption keys, use the decrypted symmetric key to decrypt the payload, and permit routing of the client communications based upon the decrypted payload of the gateway connection tickets.

16. The gateway appliance of claim 15 wherein the gateway connection tickets are further signed by private encryption keys of the PoP computing devices.

17. The gateway appliance of claim 15 wherein the processor is configured to exchange authorization and virtual session delivery data of the client communications using separate tunnels over a common transport layer session.

18. The gateway appliance of claim 15 wherein the gateway connection tickets further comprise an expiration time after which the gateway appliance will no longer permit routing of the client communications.

19. The gateway appliance of claim 15 wherein the gateway connection tickets further comprise an authentication token so that the client devices do not have to resend login credentials after establishing a connection with a gateway appliance.

20. The gateway appliance of claim 15 wherein the payloads of the gateway connection tickets comprise at least one of a virtual delivery appliance Internet Protocol (IP) address, fully qualified domain name (FQDN), and a network port number.

21. The gateway appliance of claim 15 wherein the processor is further configured to authorize connections from the client devices to the virtual delivery appliances by verifying the signatures of the gateway connection tickets and an expiration time of the gateway connection tickets.

22. The gateway appliance of claim 21 wherein the processor is further configured to recover the payload using the symmetric key responsive to the verification of the signatures.

* * * * *